(12) United States Patent
Eperjesi et al.

(10) Patent No.: US 8,605,546 B2
(45) Date of Patent: Dec. 10, 2013

(54) SEISMIC DATA ACQUISITION SYSTEMS AND METHOD UTILIZING A WIRELINE REPEATER UNIT

(75) Inventors: Richard Eperjesi, Stafford, TX (US); Keith Elder, Richmond, TX (US)

(73) Assignee: Inova Ltd., George Town, Grand Cayman (KY)

( * ) Notice: Subject to any disclaimer, the term of this patent is extended or adjusted under 35 U.S.C. 154(b) by 1063 days.

(21) Appl. No.: 11/863,103

(22) Filed: Sep. 27, 2007

(65) Prior Publication Data

US 2008/0080311 A1 Apr. 3, 2008

Related U.S. Application Data

(60) Provisional application No. 60/848,122, filed on Sep. 29, 2006.

(51) Int. Cl.
*G01V 1/00* (2006.01)
*G01V 1/22* (2006.01)

(52) U.S. Cl.
CPC .... *G01V 1/00* (2013.01); *G01V 1/22* (2013.01)
USPC .......................................................... 367/77

(58) Field of Classification Search
USPC ..................................... 367/76–80
See application file for complete search history.

(56) References Cited

U.S. PATENT DOCUMENTS

| 3,733,584 A | 5/1973 | Pelton et al. |
| 3,806,864 A | 4/1974 | Broding et al. |

(Continued)

FOREIGN PATENT DOCUMENTS

| EP | 0250280 A1 | 12/1987 |
| EP | 0552769 A2 | 7/1993 |

(Continued)

OTHER PUBLICATIONS

408UL Reference Training Guide, Firmware Network Description, Jan. 13, 2000, pp. 13-1 to 13-18.

(Continued)

*Primary Examiner* — Krystine Breier
(74) *Attorney, Agent, or Firm* — Mossman, Kumar & Tyler, PC

(57) ABSTRACT

A system and methods for acquiring seismic data is provided. In one aspect, the system and methods utilize a plurality of field service units placed over a region of interest, a repeater unit that wirelessly communicates with the field service units and a remote unit for controlling and processing the seismic data acquired by the field service units. In one aspect, the system and methods determine a condition associated with each of a plurality of attributes relating to acquisition of the seismic data at each field service unit, generate messages at each field service unit when the condition of a particular attribute meets a selected criterion, transmit the generated messages, receive the messages transmitted by at least a group of field service units at a repeater unit placed in the region of interest, analyze the messages received from the group of field service units at the repeater unit and then transmit information relating to the received messages to the remote unit for further processing. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

15 Claims, 14 Drawing Sheets

(56) References Cited

U.S. PATENT DOCUMENTS

| | | | |
|---|---|---|---|
| 3,886,494 A | | 5/1975 | Kostelnicek et al. |
| 3,946,357 A | | 3/1976 | Weinstein et al. |
| 4,086,504 A | | 4/1978 | Ezell et al. |
| 4,236,234 A | | 11/1980 | McDavid et al. |
| 4,296,485 A | | 10/1981 | Clemens |
| 4,297,700 A | | 10/1981 | Nard et al. |
| 4,366,561 A | | 12/1982 | Klein |
| 4,493,063 A | * | 1/1985 | Tims et al. ............... 367/77 |
| 4,570,257 A | * | 2/1986 | Olson et al. ............... 370/216 |
| 4,628,494 A | | 12/1986 | Rialan et al. |
| 4,639,901 A | | 1/1987 | Warmack et al. |
| 4,644,506 A | | 2/1987 | Cretin et al. |
| 4,725,992 A | | 2/1988 | McNatt et al. |
| 4,807,200 A | | 2/1989 | Montes et al. |
| 4,814,711 A | | 3/1989 | Olsen et al. |
| 4,815,044 A | | 3/1989 | Deconinck et al. |
| 4,815,944 A | | 3/1989 | Maruyama et al. |
| 4,868,795 A | | 9/1989 | McDavid et al. |
| 4,885,724 A | | 12/1989 | Read et al. |
| 4,905,205 A | | 2/1990 | Rialan |
| 4,908,803 A | | 3/1990 | Rialan |
| 4,967,400 A | | 10/1990 | Woods |
| 4,979,152 A | | 12/1990 | Rialan et al. |
| 5,189,642 A | | 2/1993 | Donoho et al. |
| 5,206,835 A | | 4/1993 | Beauducel |
| 5,276,655 A | | 1/1994 | Rialan et al. |
| 5,351,244 A | | 9/1994 | Rialan et al. |
| 5,363,094 A | | 11/1994 | Staron et al. |
| 5,396,246 A | | 3/1995 | Coquerel |
| 5,432,754 A | | 7/1995 | Brady et al. |
| 5,481,502 A | | 1/1996 | Cretin et al. |
| 5,550,787 A | | 8/1996 | Rialan et al. |
| 5,563,847 A | | 10/1996 | Grouffal et al. |
| 5,617,371 A | | 4/1997 | Williams |
| 5,623,455 A | | 4/1997 | Norris |
| 5,627,798 A | | 5/1997 | Siems et al. |
| 5,681,008 A | | 10/1997 | Kinstler |
| 5,706,250 A | | 1/1998 | Rialan et al. |
| 5,724,241 A | | 3/1998 | Wood et al. |
| 5,745,074 A | | 4/1998 | Laude |
| 5,822,273 A | | 10/1998 | Bary et al. |
| 5,829,520 A | | 11/1998 | Johnson |
| 5,842,125 A | * | 11/1998 | Modzelesky et al. ...... 455/426.1 |
| 5,959,529 A | | 9/1999 | Kail, IV |
| 5,978,313 A | | 11/1999 | Longaker |
| 6,002,640 A | | 12/1999 | Harmon |
| 6,002,641 A | | 12/1999 | Chien |
| 6,023,444 A | | 2/2000 | Naville et al. |
| 6,061,299 A | | 5/2000 | Grouffal et al. |
| 6,070,129 A | | 5/2000 | Grouffal et al. |
| 6,078,283 A | | 6/2000 | Bednar |
| 6,208,247 B1 | | 3/2001 | Agre et al. |
| 6,208,626 B1 | | 3/2001 | Brewer |
| 6,219,620 B1 | | 4/2001 | Park et al. |
| 6,226,601 B1 | * | 5/2001 | Longaker ............... 702/79 |
| 6,255,962 B1 | | 7/2001 | Tanenhaus et al. |
| 6,255,969 B1 | | 7/2001 | Crayford |
| 6,332,109 B1 | | 12/2001 | Sheard et al. |
| 6,353,577 B1 | | 3/2002 | Orban et al. |
| 6,430,106 B1 | | 8/2002 | Staron |
| 6,469,639 B2 | | 10/2002 | Tanenhaus et al. |
| 6,553,316 B2 | | 4/2003 | Bary et al. |
| 6,560,565 B2 | | 5/2003 | Roy et al. |
| 6,898,529 B2 | | 5/2005 | Gao et al. |
| 6,944,096 B2 | | 9/2005 | Lemenager et al. |
| 6,977,867 B2 | | 12/2005 | Chamberlain |
| 7,020,701 B1 | | 3/2006 | Gelvin et al. |
| 7,034,711 B2 | | 4/2006 | Sakatani et al. |
| 7,050,355 B2 | | 5/2006 | Robertsson et al. |
| 7,436,789 B2 | * | 10/2008 | Caliskan et al. ........... 370/310.1 |
| 2001/0030907 A1 | | 10/2001 | Bachrach |
| 2003/0174582 A1 | | 9/2003 | Scott |
| 2004/0156267 A1 | | 8/2004 | O'Brien et al. |
| 2004/0178905 A1 | * | 9/2004 | Dernier et al. ........... 340/500 |
| 2004/0252585 A1 | | 12/2004 | Smith et al. |
| 2004/0257913 A1 | | 12/2004 | Ray et al. |
| 2005/0114033 A1 | | 5/2005 | Ray et al. |
| 2005/0177310 A1 | | 8/2005 | Duncan et al. |
| 2005/0259514 A1 | | 11/2005 | Iseli et al. |
| 2005/0276162 A1 | | 12/2005 | Brinkmann et al. |
| 2006/0086497 A1 | | 4/2006 | Ohmer et al. |
| 2006/0145881 A1 | | 7/2006 | Sakatani et al. |
| 2007/0025486 A1 | * | 2/2007 | Gainey et al. ........... 375/356 |
| 2009/0018832 A1 | * | 1/2009 | Mukaigaito et al. ........... 704/251 |

FOREIGN PATENT DOCUMENTS

| | | |
|---|---|---|
| GB | 1 465 306 | 2/1977 |
| WO | WO9812577 A1 | 3/1998 |
| WO | WO9818022 A1 | 4/1998 |
| WO | WO9960424 A1 | 11/1999 |
| WO | WO03067283 A2 | 8/2003 |

OTHER PUBLICATIONS

SGR II, Seismic Group Recorder System: High technology with a track record., Global Universal Sciences, Inc., 1984, pp. 1-6.

SGR III, Seismic Group Recorder System, Global Universal Sciences, Inc., 1985, pp. 1-4.

LaCosta & Romberg—Scintrex, Inc. Quarterly, vol. 1, Issue 3, May 12, 2003, What's Happening at LRS?, pp. 1-4.

LRS Quarterly, vol. 1, Issue 3, May 12, 2003.

* cited by examiner

| MESSAGE | DEFINITION |
|---|---|
| POWER SOURCE CONDITION (e.g. LOW BATTERY) | THIS MESSAGE IS GENERATED WHEN THE BATTERY VOLTAGE OF THE FSU GOES UNDER THE THRESHOLD, SPECIFIED IN THE CONFIGURATION |
| MOTION SENSOR | THIS MESSAGE IS TRIGGERED BY THE MOTION SENSOR AND CAN HELP TO TRACK THE DEVICE. |
| SHOT CONDITION (e.g. MISSED SHOT) | THIS MESSAGE IS GENERATED WHEN THE SHOT SEQUENCE COUNTER VALUE MAINTAINED BY THE FSU DOES NOT MATCH THE ONE IN THE FIRE COMMAND. |
| DATA STORAGE MEDIUM CONDITION (e.g. MEMORY FULL) | THIS MESSAGE IS GENERATED WHEN THE AVAILABLE MEMORY IS LOWER THAN THE THRESHOLD SET IN THE CONFIGURATION, OR DATA OVERFLOW HAPPENED BECAUSE OF LACK OF FREE MEMORY TO STORE THE ACQUISITION DATA. |
| TIMING CHAIN SLIP | THIS MESSAGE IS GENERATED WHEN A TIMING ERROR HAS BEEN DETECTED. |
| SEISMIC ATTRIBUTE CONDITION (e.g. SEISMIC ALARM) | THIS MESSAGE IS GENERATED WHEN A SEISMIC ATTRIBUTE DEGRADES, FOR EXAMPLE IF THE SIGNAL STRENGTH OF ANGLE TOLERANCE EXCEEDS LIMITATIONS. |
| ENVIRONMENTAL | THIS MESSAGE IS GENERATED WHEN ONE OF THE ENVIRONMENTAL PARAMETERS SUCH AS TEMPERATURE OR HUMIDITY EXCEEDS THE THRESHOLD DEFINED IN THE CONFIGURATION. |
| INVALID CONFIGURATION | THIS MESSAGE IS GENERATED AS A RESPONSE TO THE 'CHECK CONFIGURATION' COMMAND BY THOSE FSUs THAT HAVE A CONFIGURATION WITH A DIFFERENT CONFIGURATION ID THAN THE ONE SPECIFIED IN THE 'CHECK CONFIGURATION' COMMAND. |
| DOWNLOAD CRC MISMATCH | THIS MESSAGE IS GENERATED WHEN THE MASTER CRC OF THE DOWNLOADED CONFIGURATION OR SOFTWARE UPDATE IS BAD. |
| SOFTWARE ERROR | THIS MESSAGE IS GENERATED AFTER A SOFTWARE FAILURE WAS DETECTED. |
| HELLO | THIS MESSAGE IS THE FIRST STEP IN THE DEPLOYMENT PROCESS AND AS PART OF THE NORMAL OPERATING PROCEDURE. THE UNSOLICITED MESSAGE DOES NOT INDICATE A PROBLEM. |
| "NOISE" | THIS MESSAGE IS GENERATED IS SEISMIC NOISE EXCEEDS LIMITATIONS; IT IS INDICATED BY AXIS (X,Y, OR Z). |
| DEVICE INITIATED UNDEPLOY | THE FSU OR RU DEVICE SHOULD TRY SENDING THIS MESSAGE ONLY 5 TIMES, MAXIMUM. IF NO RESPONSE IS RECEIVED, IT SHOULD THEN UNDEPLOY. |

FIG. 5

SEISMIC DATA ACQUISITION SYSTEMS AND METHOD UTILIZING A WIRELINE REPEATER UNIT

CROSS-REFERENCES TO RELATED APPLICATIONS

This application takes priority from U.S. Provisional Application Ser. No. 60/848,122, filed Sep. 29, 2006, the contents of which are fully incorporated herein by reference.

BACKGROUND OF THE DISCLOSURE

1. Field of the Disclosure

This disclosure relates generally to the acquisition of seismic data using seismic systems and methods that employ wireless communication between field data acquisition units and one or more remote units.

2. Background of the Art

Seismic surveys are conducted to map subsurface structures to identify and develop oil and gas reservoirs. Seismic surveys are typically performed to estimate the location and quantities of oil and gas fields prior to developing (drilling wells) the fields and also to determine the changes in the reservoir over time subsequent to the drilling of wells. On land, seismic surveys are conducted by deploying an array of seismic sensors (also referred to as seismic receivers) over selected geographical regions. These arrays typically cover 75-125 square kilometers or more of a geographic area and include 2000 to 5000 seismic sensors. The seismic sensors (geophones or accelerometers) are placed are coupled to the ground in the form of a grid. An energy source, such as an explosive charge (buried dynamite for example) or a mobile vibratory source, is used at selected spaced apart locations in the geographical area to generate or induce acoustic waves or signals (also referred to as acoustic energy) into the subsurface. The acoustic waves generated into the subsurface reflect back to the surface from subsurface formation discontinuities, such as those formed by oil and gas reservoirs. The reflections are sensed or detected at the surface by the seismic sensors. Data acquisition units (also referred to herein as the field service units or "FSUs") deployed in the field proximate the seismic sensors receive signals from their associated seismic sensors, at least partially processes the received signals, and transmit the processed signals to a remote unit (typically a central control or computer unit placed on a mobile unit). The central unit typically controls at least some of the operations of the FSUs processes the seismic data received from all of the FSUs, records the processed data on data storage devices for further processing. The sensing, processing and recording of the seismic waves is referred to as seismic data acquisition.

Two-dimensional and/or three-dimensional maps of the subsurface structures (also referred to as the "seismic image") are generated from the seismic data recorded by the central. These maps are then used to make decisions about drilling locations, reservoir size, pay zone depth and estimates of the production of hydrocarbons.

The traditional sensor used for acquiring seismic data is a geophone. Multi-component (three-axis) accelerometers, however, are more commonly used for obtaining three-dimensional seismic maps compared to the single component sensors seismic surveying layouts using multi-component sensors require use of more complex data acquisition and recording equipment in the field and a substantially greater bandwidth for the transmission of data to a central location.

A common architecture of seismic data acquisition systems is a point-to-point cable connection of all of the seismic sensors. Typically, output signals from the sensors in the array are collected by data acquisition units attached to one or more sensors, digitized and relayed down the cable lines to a high-speed backbone field processing device or field box. The high-speed backbone is typically connected via a point-to-point relay fashion with other field boxes to a central recording system, where all of the data are recorded onto a storage medium, such as a magnetic tape.

Seismic data may be recorded at the field boxes for later retrieval, and in some cases a leading field box is used to communicate command and control information with the central recording system over a radio link (radio frequency link or an "RF" link). Even with the use of such an RF link, kilometers of cabling among the sensors and the various field boxes may be required. Such a cable-system architecture can result in more than 150 kilometers of cable deployed over the survey area. The deployment of several kilometers of cable over varying terrain requires significant equipment and labor, often in environmentally sensitive areas.

FIG. 1 (prior art) depicts a conventional cable seismic data acquisition system 100. Such a system includes an array (string) of spaced-apart seismic sensor units 102. Each string of sensors is typically coupled via cabling to a data acquisition device 103, and several of the data acquisition devices and associated string of sensors are coupled via cabling 110 to form a line 108, which is then coupled via cabling 112 to a line tap or (crossline unit) 104. Several crossline units 104 and associated lines are usually coupled together by cabling, such as shown by the dotted line 114.

The sensors 102 are usually spaced between 10-50 meters. Each of the crossline units 104 typically performs some signal processing and then stores the processed signals as seismic information. The crossline units 104 are each typically coupled, either in parallel or in series, with one of the units 104a serving as an interface between the central controller or control unit (CU) 106 and all crossline units 104. In the cable system of FIG. 1, data are usually relayed from one sensor unit to the next sensor unit and through several field boxes before such data reaches the central controller. Failure of any one field box or cable can cause loss of recording of large amounts of information. Operators often halt the surveying activity until the source of the problem is determined and corrected. Consequently, common cable systems can have a relatively low average uptime, often only 45%.

The basic architecture and reliability issues of the current cable systems described above prevent seismic data acquisition systems from being scaled to significantly higher channel counts. Some cable systems incorporate different levels of redundancy to address the issue of single-point failure. These redundant systems can include multiple redundant backbones, telemetry reversal and other redundancy features. These solutions, however, require even more cable to be deployed on the ground and still limit fault tolerance to a few, often no more than two failures, in a line that can be many miles long.

Optimal spacing between seismic sensors varies depending on desired image depth and type. Obstacles are often encountered when deploying sensors such as no permit areas, rivers, and roads that cause the seismic crew to use varying spacing between sensor stations. Varying the distance between sensors in a conventional cable system is not convenient due to the fixed interval between connection points. Usually a surveying crew predetermines the appropriate positions of the sensors on the ground prior to laying out the acquisition equipment. A global positioning system (GPS)

receiver is then used by the surveyor to plant stakes in the ground at each of the thousands of predetermined sensor locations. Therefore, array deployment in such systems is a two-step process, which increases the time and labor costs of the seismic survey process.

Wireless seismic data acquisition systems have been proposed to address many of the problems associated with the cable seismic data acquisition systems. In the cable systems, large amounts of data can be transmitted over the cable connections, including problems detected by the field boxes or specific data requested or polled by the CU from the various field boxes. The wireless systems utilize radio frequency transmission and are typically bandwidth limited. In traditional wireless seismic data acquisition systems, an attribute (physical or seismic) degradation affecting the data quality is typically detected by monitoring (printing and viewing) shot (source activation) records immediately after recording. However, with ever-increasing channel counts on three dimensional seismic surveys, the bandwidth necessary for transmitting each record in real-time can be difficult.

To preserve bandwidth and to reduce or eliminate the need to monitor individual records for quality control, it is desirable to have a system in which the field devices can detect and appropriately or selectively transmit attribute degradation information (also referred to herein "alarm conditions"). Because several FSUs may detect one or more attribute degradation or other conditions simultaneously, it is desirable to manage the transmission of messages containing such information to the CU.

The present disclosure provides seismic surveying systems, apparatus and methods for managing the detection, collection and transmission of data, including messages relating to attribute degradation and other surveying conditions between the field units and a remote unit, such as a CU, central system computer (CSC) and/or an intermediate (repeater) unit, that address some of the above-noted shortcomings.

SUMMARY OF THE DISCLOSURE

The present disclosure, in one aspect, provides a system for acquiring seismic data that includes a source for generating acoustic signals, a plurality of receivers arranged in a selected region for detecting the acoustic signals, and a plurality of field station units (FSU)s, wherein each field station unit ("FSU") receives acoustic signals from at least one receiver associated therewith and determines one or more conditions relating to one or more attributes relating to the acquisition of the seismic data and automatically (without solicitation) transmits messages indicative of the detected condition wirelessly when the determined condition meets a selected criterion or is outside a norm (such as outside a threshold or limit).

In another aspect, the disclosure provides a seismic data acquisition system wherein each of a plurality of field station units acquires seismic data from at least one associated seismic sensor and transmits messages to a repeater unit when a condition relating to an attribute of the seismic data meets a selected criterion or is outside a threshold and wherein the repeater unit performs a collision management of the messages received from the plurality of the field service units before sending such messages to a control unit (CU) or a central computer station (CSC). Such messages also are referred to herein interchangeably as alarms or alarm messages.

In one aspect, the FSU encodes each message with a unique identifier, which may be a random number generated by the FSU that uses a seed number. This may be a number that includes or is based on an identification number of the FSU and time slot, such as the second of the day. The generated number may be variable or a fixed. The FSU may determine any defined condition, including a condition that relates to a physical parameter of a device associated with the FSU or a condition that relates to a seismic attribute. The conditions may include: a condition of a power source associated with the FSU, such a low battery condition; (ii) a measurement made by a motion sensor that provides information about the movement of a device, including the movement of a seismic sensor or the FSU itself; (iii) the condition of a data storage device associated with the FSU, such as a memory device, wherein the condition may include the memory capacity already used or the unused memory capacity; (iv) a condition relating to the timing of an event, such as timing chain slip; (v) an environmental parameter, such as temperature and humidity; (vi) a configuration that is outside a norm, also referred to as a configuration error; (vii) a download error; (viii) a software error; (ix) noise level; and (x) a device initiated activity, such as the turning on or off of a device by the FSU.

In another aspect, each FSU may prioritize the conditions determined by the FSU before sending the messages based on information stored in the FSU. The FSU may be programmed to discard certain conditions or limit the number of times the FSU sends a message relating to a particular condition.

As noted above, the messages sent by the various FSUs may be sent to repeater units placed within the wireless range of a group of repeaters. In one aspect, the repeater unit may establish a two-way data communication between the individual FSUs and the CU or CSC. The repeater unit may be a stand-alone unit or a particular FSU may be configured to perform the functions of the repeater, referred to herein as the Alpha FSUs. The FSUs in the field may be divided into small groups, each group including an Alpha FSU. In such configurations, the Alpha FSU or the stand alone repeater unit provide collision management of the messages sent by the various FSUs in their respective groups or packs. In one aspect, the repeater unit (stand alone or the Alpha FSU) scales the unique identifiers of the messages received from the plurality of FSUs to cover a plurality of time slots. The repeater unit or the Alpha FSU may be programmed to perform a number of operations or functions including: suppressing or filtering messages that have been determined by a control unit or according to programmed instructions as unwanted messages; suppressing messages that may correspond to a common condition to avoid flooding the CU or CSC; prioritizing the messages received from the plurality of FSUs before sending a message to the CU or CSC; allowing selected messages to pass to the CU or CSC substantially uninhibited; analyzing an attribute of a message storm (messages relating to a common condition) based on a pre-selected criterion; and compressing messages before sending to the CU or CSC. The collision management by the FSU's and/or the repeater unit prevents flooding of messages relating to a common condition of an attribute or pre-selection condition.

The CU or CSC sends acknowledgement of the received messages and may also send commands or filters directly to any particular FSU or a group of FSUs or all of the FSUs in the seismic system. The CSC also may solicit messages relating to any attribute from any particular FSU sending a request therefore.

In another aspect, the CSC processes the received messages by analyzing such messages to determine the affect of the conditions of the attribute on the seismic data acquisition process and the data quality. The CSC displays results for actions by survey crew or provides desired actions to be taken including delaying surveying, repeating a shot, sending a crew to investigate and correcting a condition of an attribute, etc.

The disclosure, in another aspect, provides a computer-readable medium including a computer program embedded therein for use by one or more processors associated with a system for acquiring seismic data from a seismic spread arranged over a selected region that includes a plurality of sensors for detecting acoustic signals in response to the acoustic signals generated by a source and a plurality of field service units (FSU), each FSU being associated with at least one receiver for acquiring and processing acoustic signals, wherein the computer program includes: instructions for receiving a plurality of conditions detected by each FSU; instructions to encode each detected condition into an encoded message based on pre-selected criterion; instructions to transmit the encoded message to a filter; instructions to prioritize the messages received at the filter; and instructions to transmit the prioritized messages to a central station computer (CSC) for further processing.

The computer program further may include: instructions to arrange the messages at the CSC using a selected criterion and instructions to provide the arranged messages for use by an operator on a display device or on a printed report.

The instructions to encode may include instructions to use a unique identifier that is one of: (i) a random number that uses a seed number; (ii) based on an identification number of the FSU and time associated with the condition; (iii) a variable value; and (iv) a fixed value. The condition may relate to a physical or seismic attribute and may include: (i) a power supply condition, (ii) a motion sensor measurement, (iii) a missed shot, (iv) a memory condition, (v) a timing chain slip, (vi) a seismic alarm, (vii) an environmental parameter, (vii) a configuration error, (viii) a download error, (ix) a software error, (x) noise level, and (xi) a device-initiated activity including one of (a) deactivating a device or a part thereof, and (b) activating a device or a part thereof.

The computer program may further include: instructions to (i) suppress an unwanted message; (ii) suppress a plurality of messages corresponding to a common condition; (iii) prioritize the messages received from the plurality of FSUs before sending a message to the CSC; (iv) allow a selected messages to pass to the CSC substantially uninhibited; (v) analyze an attribute of a message storm based on a pre-selected criterion; and (vi) and compress messages for sending to the CSC.

In another aspect, the CSC may include programs that include instructions to send one of (i) a command or filter to a particular FSU in the plurality of FSUs (ii) a command or filter to a repeater that performs collision management and (iii) a message acknowledging receipt of a message, from an FSU.

The computer program may further include instructions to execute an algorithm that prevents at least a partial flooding of the messages to the CSC that correspond to one of (i) a common condition, and (ii) a selected condition. The computer program may further include analyzing the received messages and displaying the results.

In another aspect, the disclosure provides a method for acquiring seismic data using a plurality of seismic devices arrayed over a region of interest, the method comprising: determining a condition associated with at least one of the selected devices; encoding a signal with data indicative of the condition; applying a priority criterion to the encoded signal; and transmitting the signal to a processor if the signal meets the priority criterion. The method further may include transmitting the encoded signal unsolicited over a wireless communication link.

In another aspect, a time division multiplex scheme for transferring data between the field service units and a remote unit is provided, which may be useful in collision management of the data and in using lesser number of frequencies compared to other methods, such as frequency division multiplexing.

Examples of certain features of the systems, methods and apparatus disclosed herein have been summarized rather broadly in order that detailed description thereof that follows may be better understood, and in order that the contributions to the art may be appreciated. There are, of course, additional features of the disclosure that will be described hereinafter and will form the subject of the disclosure. The summary provided herein is not intended to limit the scope. Also, an "Abstract" is provided to satisfy certain patent office requirements and is not to be used in any way to limit the concepts, embodiments and methods disclosed herein or the scope of claims that may be made in this application or any application that may take a priority from this application.

BRIEF DESCRIPTION OF THE DRAWINGS

The novel features of this disclosure, as well as the disclosure itself, will be best understood from the attached drawings, taken along with the following description, in which similar reference characters generally refer to similar elements, and in which:

FIG. 5 is an exemplary list of a variety of messages or alarm messages generated by a field service unit of FIG. 2, according to one aspect of the present disclosure;

DETAILED DESCRIPTION OF THE EMBODIMENTS

The present disclosure relates to devices and methods for controlling activities relating to seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein.

Figure 2:
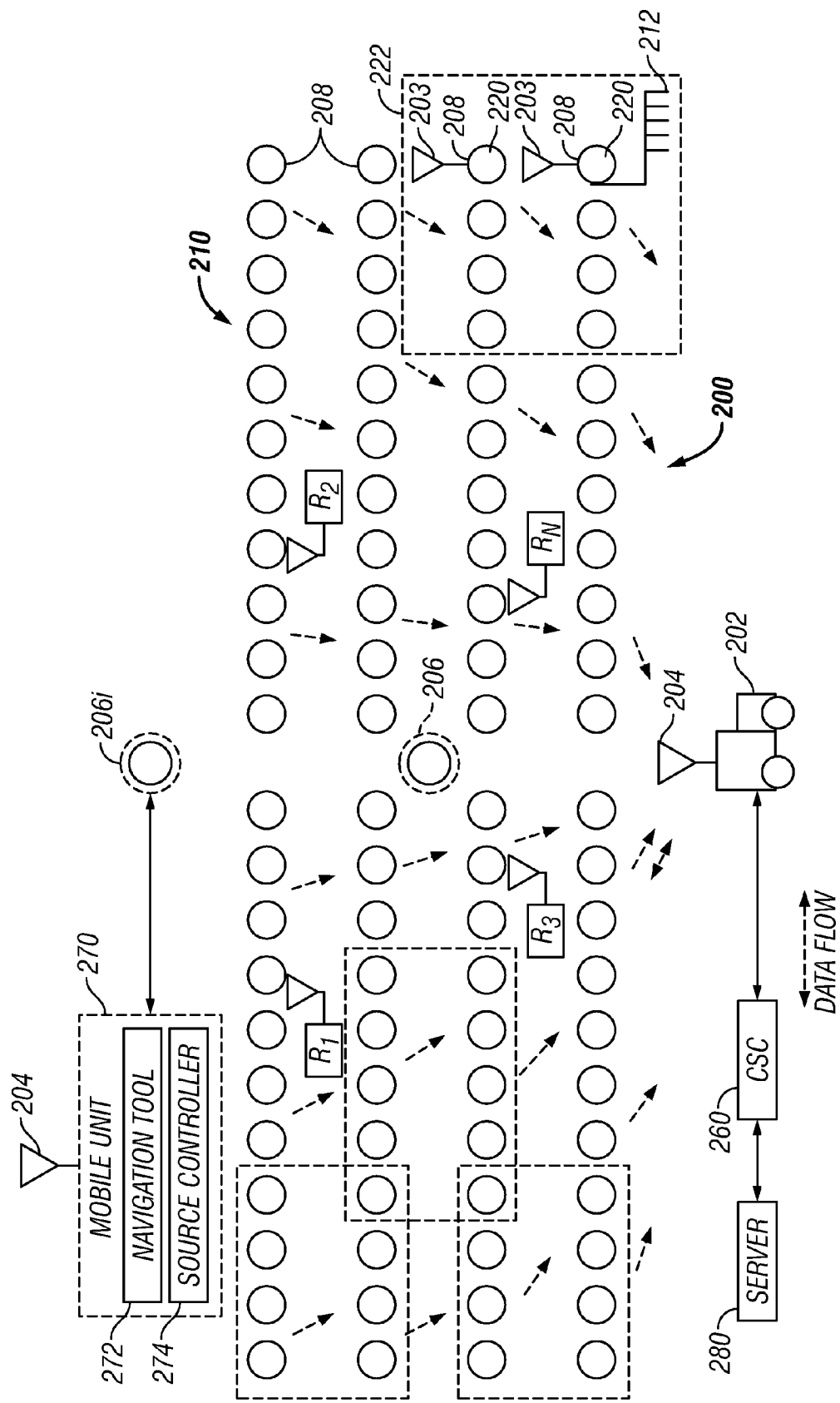
FIG. 2 is a representation of a wireless seismic data acquisition system according to one embodiment of the present disclosure.

Referring to FIG. 2, a representation of a wireless seismic data acquisition system 200 is shown according to one embodiment of the present disclosure. The system 200 includes a central controller or control unit (CU) 202 in data communication with each of a number of wireless field station units (FSU) or sensor stations 208 forming an array (spread) 210 for seismic data acquisition. The wireless communication between the central controller 202 with the FSUs may be direct bi-directional wireless communication or via an intermediate unit such as a repeater unit (RU), described in more detail later. Each sensor station 208 includes one or more sensors 212 for sensing seismic energy. The sensors 212 may be any suitable seismic sensors, including geophones, and one or more component accelerometers. Direct communication as used herein refers to individualized data flow as depicted in FIG. 2 by dashed arrows. The data flow can be bi-directional to allow one or more of: transmission of command and control instructions from the central controller 202 to each wireless sensor station 208; exchange of quality control and other data between the central controller 202 and each wireless sensor station 208; and transmission of status signals, operating conditions and/or selected pre-processed seismic information from each wireless sensor station 208 to the central controller 202. The communication might be in the form of radio signals transmitted from and received by the sensor stations 208 and central controller 202 via suitable antennas 203 and 204 respectively.

In one aspect, the system 200 operates in an active mode wherein a seismic energy source 206, such as an explosive source, a vibrator carried by a mobile unit, such as a truck or a compressed gas source, generates seismic energy of known characteristics, such as magnitude, frequency etc., at known locations in the seismic spread to impart seismic energy into the subterranean formation. In many applications, multiple seismic energy sources can be utilized to impart seismic energy into the subterranean formation. A representative seismic energy source is designated with numeral 206i. Typically, activation (or more commonly, "shooting" or "firing") of the source 206i is initiated locally by a mobile unit 270. In one embodiment, an operator in the mobile unit 270 utilizes a navigation tool 272 to navigate to a selected source location and using a source controller 274 operates the vibrator associated with the mobile unit to impart seismic energy into the subterranean formation. In another aspect, a mobile unit may be used to controllably fire explosive sources. To navigate the terrain and to determine the precise location coordinates of the source, the navigation tool 272 can be equipped with a global positioning satellite (GPS) device and/or a database having predetermined coordinates for each of the locations at which the source is to be activated. The navigation tool 272 can also be configured to provide audible or visual signals such as alarms or status indications relating to the firing activity. The source controller 274 can be programmed to receive and transmit information such as instructions to make the source 206i ready for firing, fire the source 206i, provide data indicative of the location of the mobile unit 270, the arming status of the source 206i, and data such as return shot attributes. The source controller 274 can also be programmed to fire the source 206i and provide an indication (e.g., visual or auditory) to the operator as to the arming status of the source 206i. Often, two or more mobile units 270 independently traverse the terrain underlying the spread 210 to locate and fire the sources 206i. In one configuration, the source controller 274 relies on the navigation tool 272 to transmit the GPS data to the central controller 202 or central station computer 260 (described below), either of which maybe programmed to transmit the "arm" and "fire" signals to the source controller 274. These signals may be digital signals or suitable analog signals. The source controller 274 may include a display to advise the operator of the status of the firing activity. The system 200 may also operate in a passive mode by sensing natural or random seismic energy traveling in the earth. The term "seismic devices" means any device that is used in a seismic spread, including, but not limited to sensors, sensor stations, receivers, transmitters, power supplies, control units, etc.

The central controller 202, the central station computer (CSC) 260 and a central server 280 exert control over the constituent components of the system 200 and direct activities of the operators and devices during the operation of the system 200. As discussed in greater detail below, the CSC 260 can automate the shooting of the sources 206i and transmit data that enables the sensor stations 208 to self-select an appropriate power usage state during such activity. The server 280 can be programmed to manage data and activities over the span of the seismic surveying activities, which can include daily shooting sequences, updating the shots acquired, tracking shooting assets, storing seismic data, pre-processing seismic data and broadcasting corrections. CSC 260 may be integral with the CU 202. Moreover, in some applications it may be advantageous to position the controller 202 and CSC 260 in the field at different locations, and the server 280 at a remote location. The central controller 202 also may act as a central radio unit. For large fields, radio antennas and repeater transceivers may also be deployed at selected field locations as described below.

Still referring to FIG. 2, the use of individual wireless FSUs 208 to form the spread 210 eliminates interconnecting cables, such as the cables 110 associated with the cable system described above and shown in FIG. 1. Elimination of these cables provides the survey crew the option of moving individual FSUs 208 without affecting placement of other sensors in the spread. It also reduces the weight of devices for the overall seismic spread and the time it takes to place the sensors and the FSUs in the field. It also allows for increased sensor density, layout flexibility, increased reliability and easier maintenance.

The seismic spread configuration of FIG. 2 can also eliminate single-point failures that can cause information loss from at least an entire line of sensors, which can occur in a cable system (FIG. 1) due to a failed cable, cable connector, field box, or a crossline unit. The single station radio architecture of the present disclosure provides independent communication paths between the FSU's and CU or CSC. The failure of a single radio acquisition unit causes loss of data from only one station and recording of data from other stations can continue while it is repaired or replaced.

In another aspect, the seismic spread configuration shown in FIG. 2 may be modified, wherein a number of neighboring FSUs 208 forming a "group" or "cell" communicate within the control unit 202 on the CSC 260 via an intermediate Field Service Unit (also referred to herein as an Alpha FSU). An Alpha FSU may also be configured to perform the functions of the FSU and further configured to performed a variety of other functions, such as establishing two-way communication between the Alpha FSU and its associated FSUs, manage collision between multiple alarm messages sent by its associated FSUs, etc. In this manner, the various FSUs may be grouped into several groups, each group including an Alpha FSU. For example, FSU 220 in the group 222 may be an Alpha FSU for the group of FSUs in the geographical area 222. Other groups of FSUs in the seismic spread 210 may be similarly grouped.

Alternatively, one or more separate repeater units (RUs) may be placed at selected locations in the seismic spread 210, such as shown by repeaters $R_1$, $R_2$, $R_n$ etc. often only one repeater is used in a seismic spread. Each repeater unit is configured to establish a two-way radio or wireless communication between its associated FSUs and the CU 202 or the CSC 260. In the above-noted configurations, the individual FSUs communicate with their associates Alpha FSU or the repeater unit as the case may be and the Alpha FSU or the repeater unit communicates with the central controller 202. The individual FSUs in a group wirelessly communicate with their associated Alpha FSU or the RU wirelessly. In certain situations, it may be desirable to connect the FSUs to its associated Alpha unit with cable connections. The operations and functions of the Alpha units and the repeater units is described in more detail in reference to FIGS. 6-10.

Figure 3:
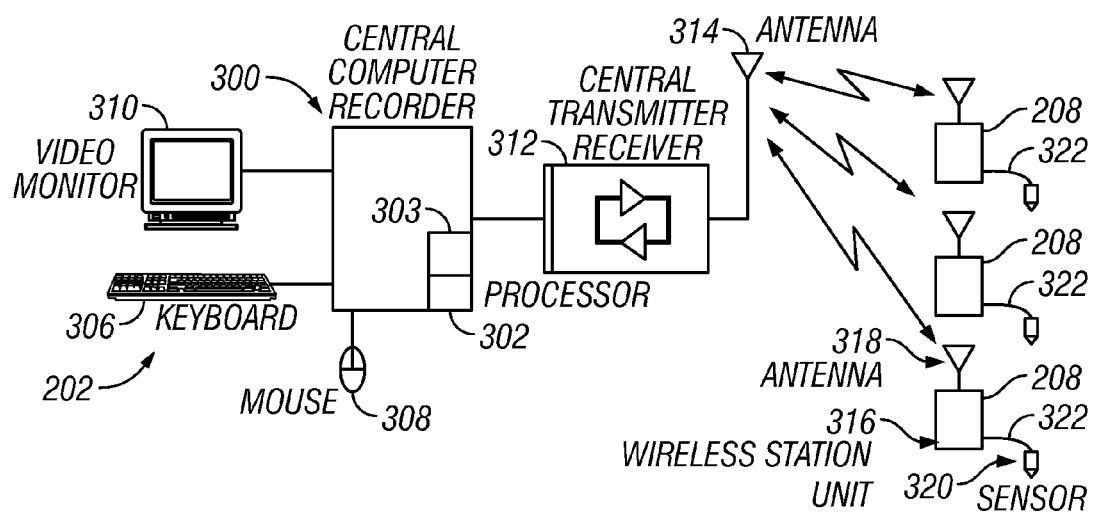
FIG. 3 shows a schematic representation of a portion of the system of FIG. 2 in more detail according to one embodiment of the present disclosure.

FIG. 3 is a more detailed schematic representation of a portion of the system 200. As shown, the central controller 202 includes a computer 300 having a processor 302 and a data storage device or memory 303. An operator can interface with the system 200 using a keyboard 306, or another suitable device, such as a mouse 308 and an output device such as a monitor 310. Communication between remotely-located system components in the spread 210 and the central controller 202 is accomplished using a central transmitter-receiver (transceiver) unit 312 associated or coupled with central controller 202 and an antenna 314.

The central controller 202 communicates with each wireless sensor station 208. Each wireless sensor station 208 shown includes a wireless field station unit (FSU) 316, an antenna 318 compatible with the antenna 314 used with the central controller 202, and a sensor unit 320 responsive to acoustic energy traveling in the earth co-located with a corresponding wireless sensor station. Co-located, as used herein, means disposed at a common location with one component being within a few feet of the other. Therefore, each sensor unit 320 can be coupled to a corresponding wireless station unit by a relatively short cable 322, e.g., about 1 meter in length, or coupled by integrating a sensor unit 320 with the wireless field station unit 316 in a common housing. (not shown)

One sensor for use in a sensor unit 320 may be a suitable multi-component sensor. The multi-component sensor may include a three-component accelerometer sensor incorporating micro electromechanical systems (MEMS) technology and application-specific integrated circuits (ASIC) as found in the Vectorseis® sensor module available from ION Geophysical Corporation, Houston, Tex. The present disclosure, however, may utilize velocity sensors such as geophones or pressure sensors such as hydrophones or any other sensor capable of sensing seismic energy. Furthermore, the present disclosure may utilize a single sensor unit 320 as shown in FIG. 3, or the sensor unit 320 may include multiple sensors connected in a string.

Figure 4:
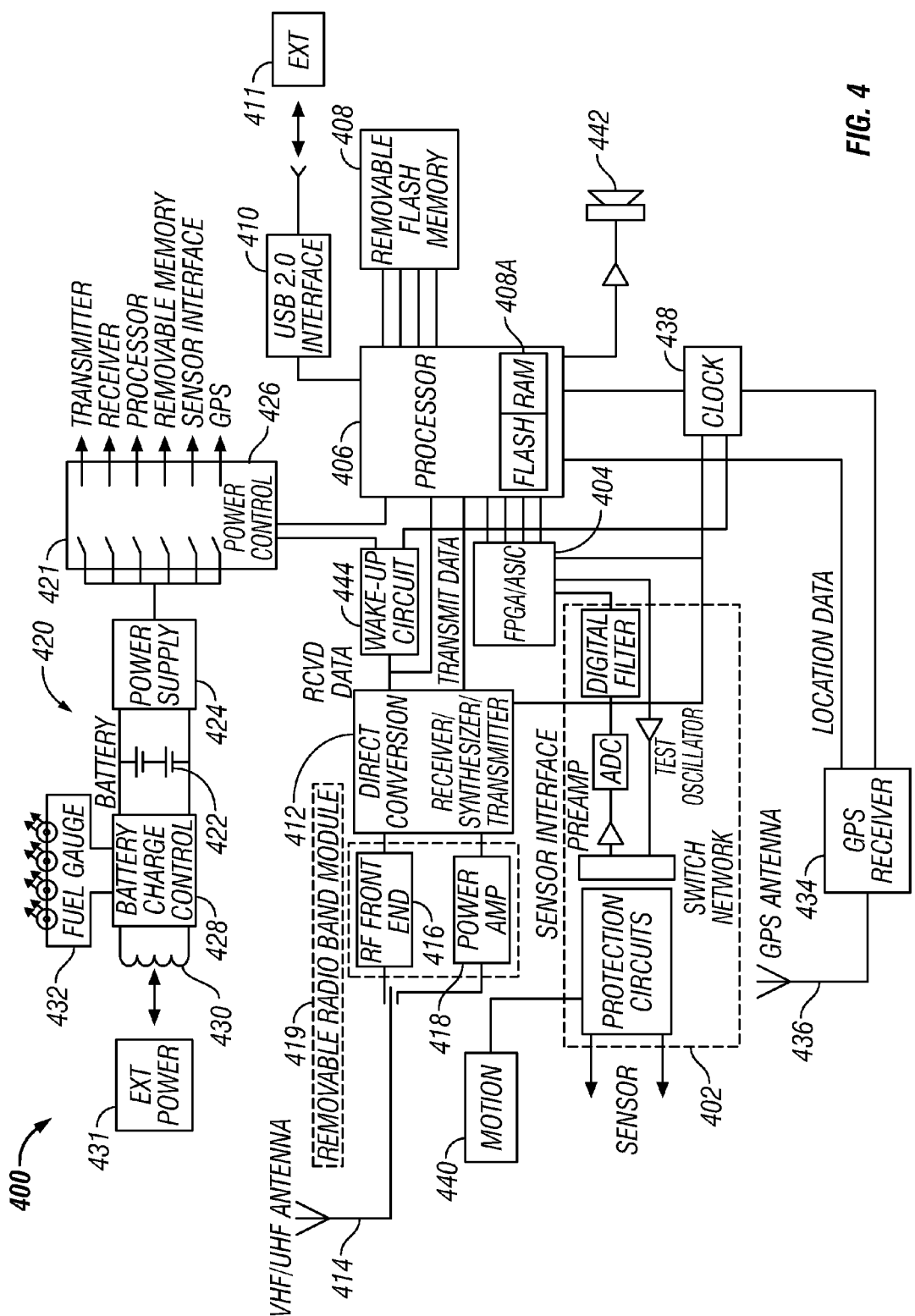
FIG. 4 shows an embodiment of a wireless field station unit having an integrated multi-component seismic sensor and processing electronics and stored programs, according to one embodiment of the present disclosure.

FIG. 4 is a schematic representation of a wireless field station unit 400 according to one embodiment of the present disclosure that operates as a data recorder incorporating circuitry to interface with an analog output sensor unit (not shown). The wireless station unit 400 shown is a data acquisition device that includes a sensor interface 402 to receive an output signal from the sensor unit such as sensor units 320. The sensor interface 402 shown includes a protection circuit, switch network, preamplifier, test oscillator, and ADC and digital filtering circuits to pre-process the received signal. The sensor interface 402 is controlled in part by a field programmable gate array (FPGA) and/or an ASIC controller circuit 404. An on-board local processor 406 processes the signal to create storable information indicative of the seismic energy sensed at the sensor unit. The information can be in digital form for storage in a suitable storage device 408, also referred to herein as a memory unit. The memory unit can be removable as shown at 408 and/or dedicated 408*a* with a coupling 410 for providing access to the stored information and/or for transferring the stored information to an external storage unit 411. The coupling 410 might be a cable coupling as shown or the coupling might be an inductive coupling or an optical coupling. Such couplings are known in the art and thus are not described in detail.

The memory 408, 408*a* can be a nonvolatile memory of sufficient capacity for storing information for later transfer or transmission. The memory might be in the form of a memory card, removable miniature hard disk drive, an Electrically-Erasable Programmable Read Only Memory (EEPROM) or the like. A memory card, also known as a flash memory card or a storage card, is a small storage medium used to store digital information and is suitable for use in seismic prospecting. Flash memory is a type of nonvolatile memory that can be erased and reprogrammed in units of memory called blocks.

Interface with the central controller 202 is accomplished with a communication device such as an on-board transmitter-receiver circuit 412, and an antenna 414 selected for the desired transmitting/receiving frequency to provide direct communication with the remotely-located central controller 202. The transmitter/receiver circuit 412 may be a direct conversion receiver/synthesizer/transmitter circuit and can alternatively be implemented as a software defined radio transceiver. Alternatively, the transmitter/receiver circuit 412 might be any suitable circuit providing transceiver functions such as transceivers utilizing superheterodyne technology. The antenna 414 can include a VHF/UHF antenna. Other circuitry might include a radio frequency (RF) front end circuit 416 and a power amplifier 418 for enhancing communication with the central controller 202. These circuits might advantageously be in the form of a removable radio band module 419 to allow operation over a broad frequency band when used with replaceable antennas. A direct conversion radio transceiver provides the advantages of operation over a broad frequency band, allows smaller overall size for the station unit 400, and reduces overall weight for field-transportable units.

Local power is provided by a power supply circuit 420 that includes an on-board power source, such as a rechargeable battery 422. The battery 422 might be of any suitable chemistry and might be nickel-metal hydride (NMH), a lithium-ion or lithium-polymer rechargeable battery of adequate size for the particular application. The battery provides an output to a power supply 424 to condition and regulate power to downstream circuits and the power supply output is coupled to a power control circuit 426 for distributing power to various local components. The wireless station unit 400 also includes power management circuitry 421 that shifts the station unit 400 between one or more selected levels of power use: e.g., a sleep mode wherein only the "wake" circuitry is energized to a high-active mode wherein the receiver can detect seismic energy. The power circuit 420 further includes a charging device 428 and charger interface 430 for coupling the charging device 428 to an external power source 431. A charge indicator 432 provides an indication of amount of charge and/or charging time remaining for the power circuit 420. Such indicators are somewhat common and further description is not necessary here.

Location parameters (e.g., latitude, longitude, azimuth, inclination, etc.) associated with a particular wireless sensor station help to correlate data acquired during a survey. These parameters may be determined prior to a survey using a selected sensor location and nominal sensor orientation and the parameters can be adjusted according to the present disclosure. The location parameters are stored in a memory 303, 408 either in the central controller or in the station unit 400. In one embodiment, the wireless sensor station includes a global positioning system (GPS) receiver 434 and associated antenna 436. The GPS receiver in this embodiment is shown coupled to the processor 406 and to a clock circuit 438 to provide location parameters such as position and location data for correlating seismic information and for synchronizing data acquisition. Alternatively, location parameters can be transmitted to and stored in the central controller and synchronization may be accomplished by sending signals over the VHF/UHF radio link independent of the GPS. Therefore, the on-board GPS can be considered an optional feature of the disclosure. Location parameters associated with sensor orientation can be determined by accelerometers and/or magnetic sensors and/or manually.

In one embodiment, a wake up circuit 444 allows the wireless station unit to control power consumption from the battery throughout different operating modes. The wake-up circuit 444 can be triggered from a number of specified sources; the radio receiver 412, the clock 438, a motion sensor or environmental condition sensor (not shown). In a low power mode, for example, power is applied only to the radio receiver 412 and the wake-up circuit 444. If a specific wake up command is transmitted over the radio and decoded by the wake-up circuit, other circuits such as the processor 406 will be enabled and come on-line to support further processing of commands and signals received from the sensor unit. Alternatively the wake up circuit could energize the radio receiver 412 at predetermined time intervals as measured by signals received from the clock 438. At these intervals the radio receiver would be enabled briefly for receiving commands, and if none are received within the enabled time period, the receiver 412 will power down, either autonomously or by command from the wake up circuit.

In one embodiment, the wireless station unit 400 further includes a motion sensor 440 to detect unwanted movement of the station unit or to detect around the station unit, in which a proximity sensor might be used. Such unwanted movement might be caused by wildlife interfering with the unit, soil movement or the like. Furthermore, the movement might be indicative of an attempted theft of the station unit. In the latter event, the wireless station unit might also include an audible alarm 442 to deter theft and to keep animals away from the station unit. Any unwanted movement will be detected by the motion sensor, and a motion sensor output is coupled to the unit by a dedicated interface circuit, or the output can be integrated into the sensor interface.

The motion sensor output is processed using the on-board processor 406 and the processed output is transmitted via the on-board transmitter/receiver circuit 412 to the central controller to alert the operator of the unwanted movement. The GPS receiver output can be processed along with the motion sensor output. This enables tracking of the wireless sensor station unit in the event of theft.

In one embodiment, the function of motion sensing is accomplished with the same sensor unit 208 that is performing the seismic energy sensing function. In the embodiment having the sensor unit integrated into the wireless station unit, the seismic sensor output may include components associated with the desired sensed seismic activity as well as sensed components associated with unwanted movement. The output is processed in conjunction with the output signal from the GPS receiver to indicate unwanted station movement. Thus, an output signal transmitted to the central controller 202 might include information relating to unwanted movement as well as seismic information, state of health information or other information relating to a particular wireless station unit 316 and/or sensor unit 320.

In several alternative embodiments, methods of the present disclosure are used to sense, record and transfer information from a seismic sensor location to a central recorder.

In one embodiment, a wireless station unit is substantially as described above and shown in FIG. 4. Each wireless sensor station is transported to a predetermined spread location. Upon arriving at the location, viability of the location is determined in real time based on the terrain, obstacles borders, etc. The location is adjusted where necessary and feasible. If adjusted, location parameters (e.g., latitude, longitude, azimuth, inclination, etc.) associated with the particular wireless sensor station so adjusted are determined and entered as updated system parameters. In one embodiment, these parameters are determined using a GPS receiver to determine the actual location of the planted sensor unit. Other parameters might be determined with a manual compass used by the crew or by one or more magnetometers in the sensor unit. Parameters might also be determined using multi-component accelerometers for determining orientation of the planted sensor unit. In one embodiment the updated system parameters are entered by the field crew in the wireless sensor station unit itself. In another embodiment, the updated system parameters are entered at the central controller. In another embodiment, the updated system parameters are entered automatically upon system activation and sensor station wake-up using location parameters and orientation parameters determined by a GPS receiver, accelerometers, magnetometers, and/or other sensors disposed in the station or sensor unit or both.

Referring back to FIGS. 2-4, the system 200 according to the present disclosure includes a CU 202 remotely located from a plurality of station units 208. Each station unit 208 includes an FSU and a sensor unit 320 remotely located from the central controller 202. Each sensor unit 320 is coupled to the earth for sensing seismic energy in the earth, which might be natural seismic energy or energy produced from a seismic source 206. The sensor unit 320 provides a signal indicative of the sensed seismic energy, and the FSU 316 co-located with the sensor unit receives the signal and stores information indicative of the received signal in a memory unit 408 disposed in the FSU 316. A communication device 412 is co-located with the sensor unit and the recorder device for providing direct two-way wireless communication with the central controller.

An exemplary CSC 260 includes one or more processors programmed with instructions that controls firing of sources 206*i* in a predetermined sequence or progression. For instance, the CSC 260 controls firing initiation, the sequence of firing and the time interval between firings. In one mode, a plurality of mobile units 270 each navigate to a separate source 206*i*. Each mobile unit 270 transmits a signal to the CSC 260 upon locating a source 206*i*. As discussed previously, the mobile unit 270 includes a source controller 274 that controls the firing of the sources 206*i*. In an exemplary operating mode, the source controller 274 determines the location (e.g., x-y-z coordinates) of the source 206*i* from a GPS Device (not shown) and transmits the coordinates to CSC 260. In response, the CSC 260 transmits status information to the source controller 274, which can be presented visually or otherwise to an operator. The status information can include the relative position of the mobile unit 270 in a queue of mobile units that have reported as ready to fire and expected time until firing commences. By "reporting," it is generally meant transmitting a data encoded signal, which can be a voice signal or a machine generated signal that can be processed by the CSC 260. When ready, the CSC 260 transmits an "arm" signal to instruct the mobile unit 270 to prepare the source for firing. Upon receiving a "fire" signal transmitted by the CSC 260, the mobile unit 270 initiates the necessary actions to fire the source 206*i*. Optionally, a mobile unit 270 may simply maintain the source 206*i* in the "armed" position so that when the CSC 260 transmits the "fire" signal when it is ready, the source controller 274 immediately fires the source 206*i*.

The exchange of data between the mobile units 270 and the CSC 260 enables the CSC 260 to manage the queue of mobile units 270 that report as having found a source 206*i*. In accordance with programmed instructions, CSC 260 determines a progression of firing of the sources 206*i*, and transmits appropriate instructions/data to the reporting mobile units 270 and the receiver spread 210.

In a seismic data acquisition system, such as the system shown in FIGS. 2-4, a large number of conditions relating to the field devices, seismic signal acquisition and data transmission among the various field devices can occur that can adversely affect the data acquisition process or the quality of such data. In traditional seismic data acquisition systems, any physical or seismic attribute degradation adversely affecting the data acquisition typically is detected by monitoring shot records immediately after recording of the data. However, due to the very large channel counts for three-dimensional seismic surveys, the bandwidth for transmitting each record in real-time may be insufficient. In one aspect, the disclosure, provides a system and methods that detect and transmit messages relating to attribute degradation without operator intervention that utilizes less bandwidth.

To detect and transmit attribute degradation information, each FSU is configured and programmed to determine the condition or a value relating to a number of selected attributes, including physical and seismic attributes. A physical attribute typically relates to a physical state or the health of a device which may affect its ability to perform an operation or function at a desired level. Such attributes include, but are not limited to: an environmental condition or a parameter such as temperature and humidity levels; condition of a power source, such as the remaining battery power; location of a device other than the pre-specified location, such as the location of a seismic sensor or source; a movement of a device from a desired location; and data storage capacity, such as remaining memory capacity, etc. A seismic attribute typically relates to the quality of the seismic data being received and recorded, such as noise level, signal strength, vertical orientation of a sensor, software error, etc. The FSU detects or determines the condition of each such attribute and generates a message when the value of a particular attribute does not meet a threshold and generates a message (also referred to as an alarm message). An alarm message is said to exist when a particular attribute does not meet a threshold, i.e. when the attribute value is below a selected value; the attribute value is above a selected value; or the attribute value is outside a range or band of values. The FSUs also may generate messages other than alarm messages.

FIG. 5 shows a chart 500 of examples of messages 550-574 that may be generated by an FSU. Each such message is generated when the corresponding attribute (physical or seismic) does not meet a threshold provided to the FSU for such attribute. The message includes: "power source condition" 550—when the battery voltage of an FSU is below a threshold value specified in the FSU configuration; a "motion sensors" 552—when a particular device moves from a selected location so that it can be tracked; "shot condition" 554—when the shot sequence count value maintained by the FSU does not match the one in the first command; "Data storage medium condition" 556—when the available memory of an FSU for recording data is below a threshold level set in the configuration of the FSU or when a data overflow occurs because of lack of free memory to store the acquisition data; "timing chain slip" 558—when the FSU detects a timing error; "Seismic Attribute Alarm" 560—when a seismic attribute degrades, for example when the signal strength or angle tolerance exceeds a preset limitation; "Environmental Condition" 562—when one of the environmental parameters, such as the temperature or humidity exceeds a corresponding threshold defined in the FSU configuration; "Invalid Configuration" 564—as a response to a "check configuration" command by those FSUs that have a configuration with a different configuration ID than the one specified in the "check configuration" command; "Download CRC Mismatch" 566—when the master CRC of the downloaded configuration or software is incorrect; "Software Error" 568—when a software failure is detected; "Noise" 572—when seismic noise exceeds a limitation and may be indicated by axis (x. y or z); and "Device Initiated Undeploy" 574—when the FSU or Repeater Unit wishes to undeploy a certain device or aspect of the operation relating thereto and may be set to send such a message a fixed number of times, (for example, five) and if the FSU or RU as the case may be does not receive a response from the central control unit, or the CSC, it may undeploy the device. The FSU also may initiate a message that is not an alarm message, such as "Hello" 570—as a first step in the deployment process and as part of the normal operating procedure. Other messages may be defined based on the design of the various devices and the method of obtaining seismic data for a particular seismic spread. Thus, for the most part, the messages relate to an alarm condition, but may include other desired messages, such as "Hello" and other messages.

In one aspect, the messages generated by each FSU may be sent wirelessly to the central unit 202 or the CSC 260 (FIG. 2) either directly or via an intermediate unit, such as an associated Alpha FSU, such as FSU 220 (FIG. 2) or via a repeater unit, such as any of the repeater units $R_1$-$R_n$ (FIG. 2).

In one aspect, the messages or alarms may be sent "unsolicited." In this mode, the FSU's generate messages relating to the selected attributes when they are outside of their respective thresholds, and automatically transmit the generated messages directly to the central control unit or the CSC, or via an intermediate unit (such as a repeater) based on the seismic spread configuration, as described in more detail in reference to FIGS. 6-9. In another aspect, the FSUs or repeater units may send at least some of the messages when they are solicited by a central control unit or CSC as described in more detail in reference to FIG. 10.

Figure 6:
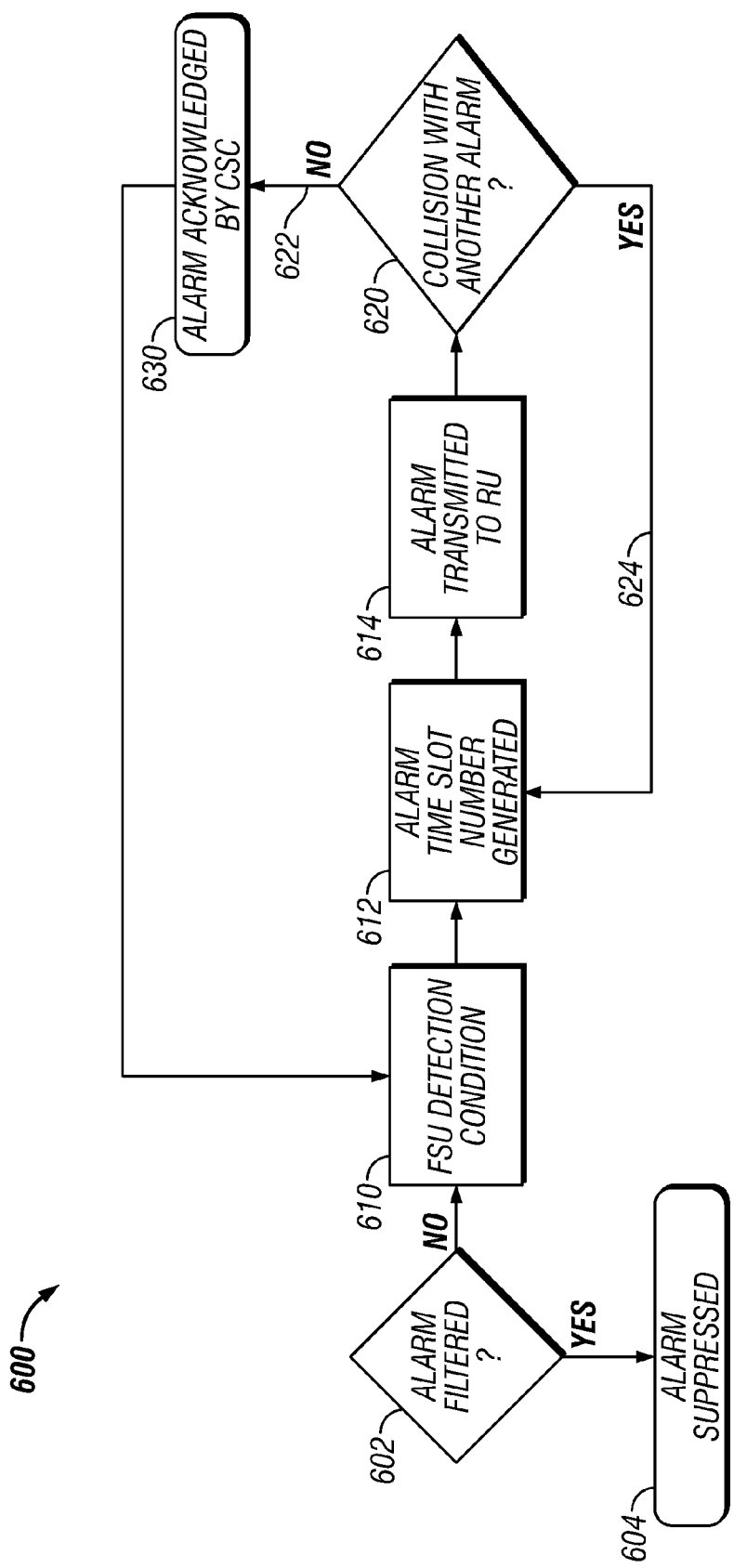
FIG. 6 shows a message data flow of a wireless seismic data acquisition system that includes a repeater unit, according to one aspect of the present disclosure.

FIG. 6 shows an alarm message transmission dataflow according to one aspect of the disclosure. When an FSU detects an alarm condition with a physical or seismic attribute, it checks for a filter or mask (602) that has been enabled to block that specific alarm condition or message. The filter or mask may be enabled by a command from a repeater unit, the central controller, CSC or programmed in the FSU. If the alarm condition is enabled, the FSU suppresses the alarm condition (604) and does not send a corresponding alarm message. If the alarm condition is not enabled, the FSU generates an alarm message that includes or is associated with a unique identifier, such a "time slot selection" (612) described in more detail below. The alarm message then relays to the repeater unit (RU) (614). The RU then attempts to transmit the received message to the Central control unit or the CSC. CU or the CSC acknowledges the receipt of the message (624). Since the RU receives messages from multiple FSUs, simultaneous transmission of such messages to CU or the CSC can result in such messages colliding (620), resulting in possible corruption of such messages or the successful transmission of one message and the loss of the other messages. If a message is lost (624) and no subsequent acknowledgement is received from the CU or CSC, the FSU generates a new time slot number for the lost alarm condition and reattempts transmission. If there is no collision (622) the alarm message proceeds to the CU or the CSC, which is acknowledged by the CU or CSC.

As noted above, to increase the likelihood that the messages generated by the various FSUs are received by the CU or CSC, each FSU may calculate a random number through an algorithm using a seed number. The algorithm may be stored in the FSU memory. The seed number may be a combination of the serial number of the FSU and the current second of the day (the time slot). The use of the serial number can reduce the probability that different FSU's in the seismic spread will calculate the same random number. The inclusion of the time slot reduces the probability that two specific FSUs with an initial collision will continue to collide. The random number calculated is then scaled to cover a number of time slots. The time slot index for the message may simply be that scaled random number (for example: plus one, depending upon the software indexing).

Figure 7:
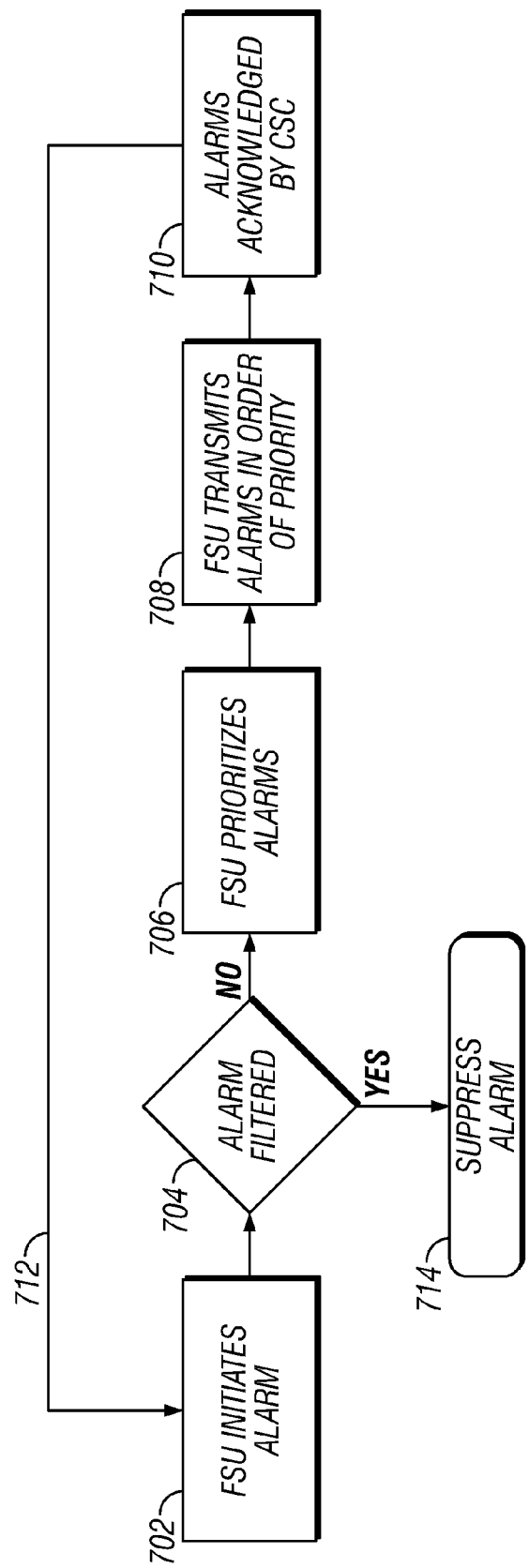
FIG. 7 shows a message data flow according to another aspect of the present disclosure wherein the field station units directly communicate with a central unit.

Alternatively, the messages generated by an FSU may be directly transmitted to the CU or the CSC as shown in FIG. 7. The FSU generates or initiates alarm messages (702) corresponding to a detected alarm condition and checks whether such a message is to be filtered or discarded (704) in response to a command received from the CU or CSC. If no filter is to be applied, the FSU prioritizes the message (706) if more than one message is generated by the FSU, and transmits the message (708) in the determined priority to the CU or CSC. If a particular message is to be suppressed, the FSU may discard or store such a message (714). The CU or the CSC acknowledges the alarm (710) and transmits acknowledgement of the received message to the FSU (712) as the FSU and CSC are in bidirectional data communication wirelessly. Certain messages may be designated as priority messages. Such messages are sent to the CU or CSC automatically prior to other messages. In FIGS. 6 and 7, the communication for the CSC to the FSU may pass though a CU.

Still, when more than one FSU transmit alarm messages at the same time, alarms may collide. In such a case, the colliding alarms can corrupt each other and one or more such alarms may not reach the CU or the CSC. Also, the stronger alarm message may overpower the weaker alarm message and reach the CU or the CSC. In either case, the messages that are not acknowledged by the CSC are retransmitted by the FSU or the repeater or directly to the CSC, as the case may be. The FSU or the repeater may be programmed to reschedule the alarm if it does not detect an acknowledgement such as within a second or another time period after the transmission of the alarm.

Typically, during normal surveying activities, a small number of FSUs are expected to transmit alarm messages in the same time slot. However, a thunderstorm or noise generated by a train or other vehicle passing through or adjacent the seismic spread can trigger many simultaneous messages indicating an unacceptable noise level at multiple FSUs, creating a "storm" of messages. As noted earlier, the FSUs keep an unacknowledged message pending and repeat attempts to transmit such pending messages may repeatedly jam the data transmission in the system. To reduce the amount of alarm collisions during alarm repetition, the system can increase the random number range used in the time slot number generation described above, which decreases the number of FSUs required to repeat unacknowledged messages due to the increased available range of time slot number generated during the first available second. This method can increase the likelihood (odds) of successful transmission of many or all of the messages.

In another aspect, to reduce or avoid interference by minor alarms crowding the system during a storm, alarm filtering may be performed. Filtering of alarms may be used to both diagnose the condition of a specific alarm storm, as well as enable urgent messages to reach the CU or the CSC unimpeded. The alarm messages that are deemed urgent may be specifically identified, such as by a tag or marker and stored in the FSU memory or the repeater memory. An operator at the CU or the CSC may send command signals issuing a temporary filter or mask for a particular or specific alarm-type that is flooding the system. In such a case, the FSU's will not generate such an alarm message until the mask or filter is disabled.

Figure 8:
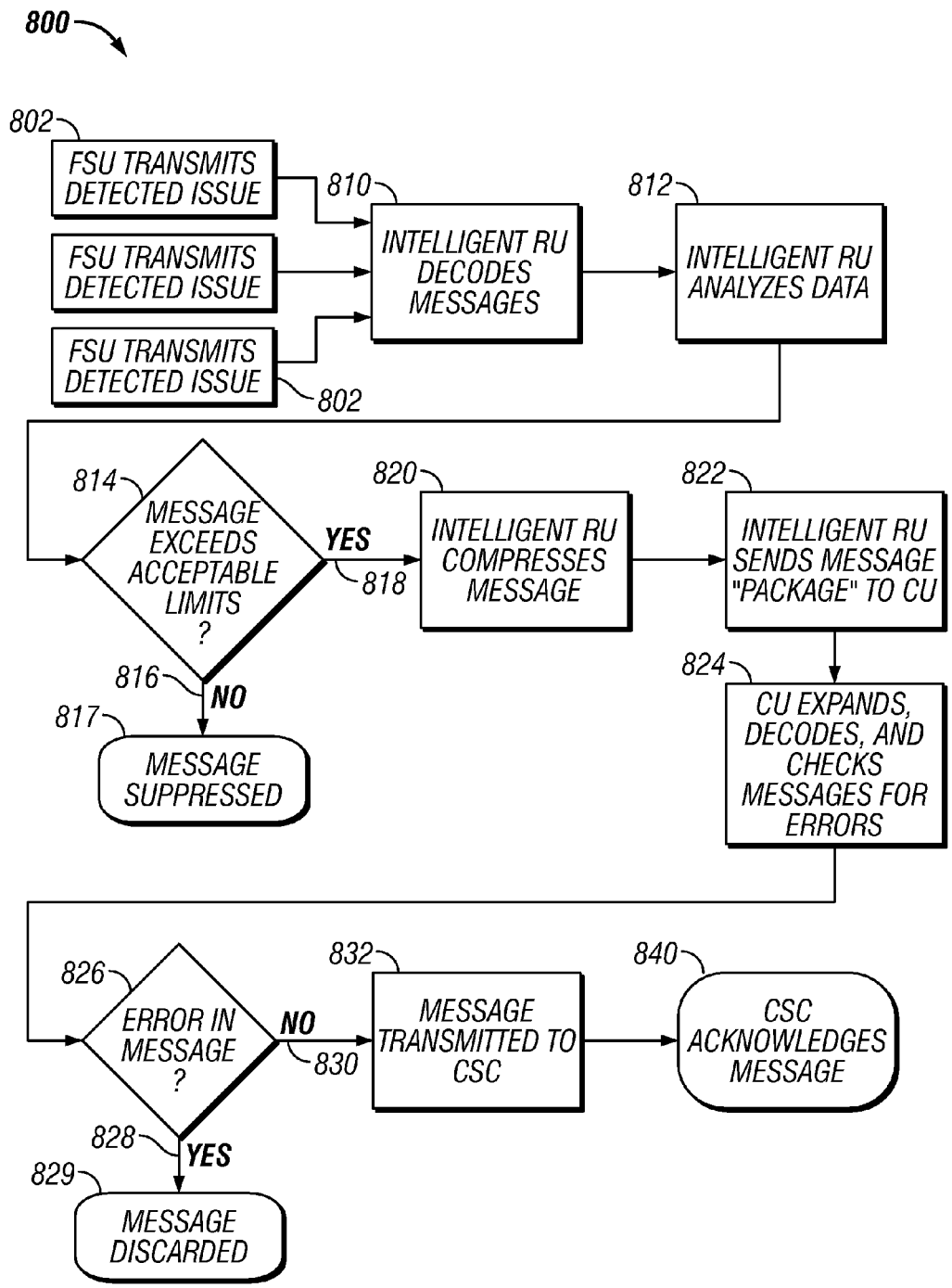
FIG. 8 shows a process according to yet another aspect of the disclosure using a repeater unit.

FIG. 8 shows an alternative unsolicited message transmission dataflow for a seismic surveying system that uses a repeater unit. In this embodiment, the RU can parse the messages from the FSU group associated with the RU or in its care instead of transmitting the received messages to the CSC unmodified. In one aspect, RU may group or compress the data into a single large packet, eliminating the repetition of overhead inherent in the transmission of multiple separate messages. In one aspect, the RU compares a status message to the previous one received from that FSU, and withholds any repetitious or insignificantly-changed status messages. This message elimination in addition to the message compression allows the RU to transmit important messages from many more FSUs in a given time. In one aspect, the RU may perform this analysis using an algorithm with preset threshold (such as minimum values) values for each message type. Once a message exceeds the preset minimum value, the RU compresses and sends the urgent messages as a "package." The algorithm is stored in the memory of the RU. In this manner, important or urgent messages are transmitted among survey devices in near real-time, improving the efficiency of seismic survey data acquisition and the resulting quality of the seismic data.

In the particular message data flow scheme of FIG. 8, the unsolicited messages are generated by the FSUs to notify the CSC about conditions that require immediate attention. Each FSU detects alarm conditions with a physical or seismic attribute and transmits the alarm messages to its designated ("parent") RU (802). The RU decodes (810) and analyzes (812) each message to determine the severity of the message. The severity levels may be preprogrammed in the RU. The RU determines whether the message exceeds one or more acceptable predefined limits (814). If the message is within the acceptable limits (e.g., a first warning of a low battery) (816), the message is suppressed (817) by the RU. Messages that exceed acceptable limits (818) are then compressed (820) into a package and transmitted to the CU (822).

In cases where numerous identical messages are recognized by RU, instead of forwarding each detailed message, the RU may transmit to CU a tally for that message type. The CU then expands and decodes the message package (824), and checks for errors (826) in the message (e.g., whether a message is incomplete). If an error is found (828), that message is discarded by the CU (829). If any alarm condition continues or escalates, the FSU will initiate another alarm that will follow the process described above. If no errors are found (830), the message is transmitted to the CSC by CU (832), where it is acknowledged by the CSC to FSU via the CU and RU (840). This can reduce or eliminate the transmission of the repetitive or less important information that can congest the communication during seismic data acquisition. The removal of less important or unnecessary data and/or compressing selected data enables preserving the efficiency of even very large seismic surveying systems.

As described in reference to FIG. 2, in certain geographical conditions, selected FSUs, referred to as the Alpha FSUs, may be positioned as repeater units, eliminating or reducing the need for RUs. An Alpha FSU may include the algorithms and programs described above with respect to an RU and thus perform the analysis, filtering and data compression from the FSUs in its group or cell and transmit the data to the CU directly or via a repeater. This configuration can eliminate or reduce the number of repeaters. Each FSU in a group or cell may be positioned to be within the radio range of one another and the associated Alpha FSU, which also is within the line-of-sight of the CU. Such a configuration is useful in geographical areas, such as canyons, gullies, wherein the FSUs within a group or pack are located in the canyon or gullies while the Alpha FSU is placed in radio range of each FSU in the pack and in line-of-sight of the CU. To avoid interference among the various groups, frequency multiplexing may be used.

Figure 9:
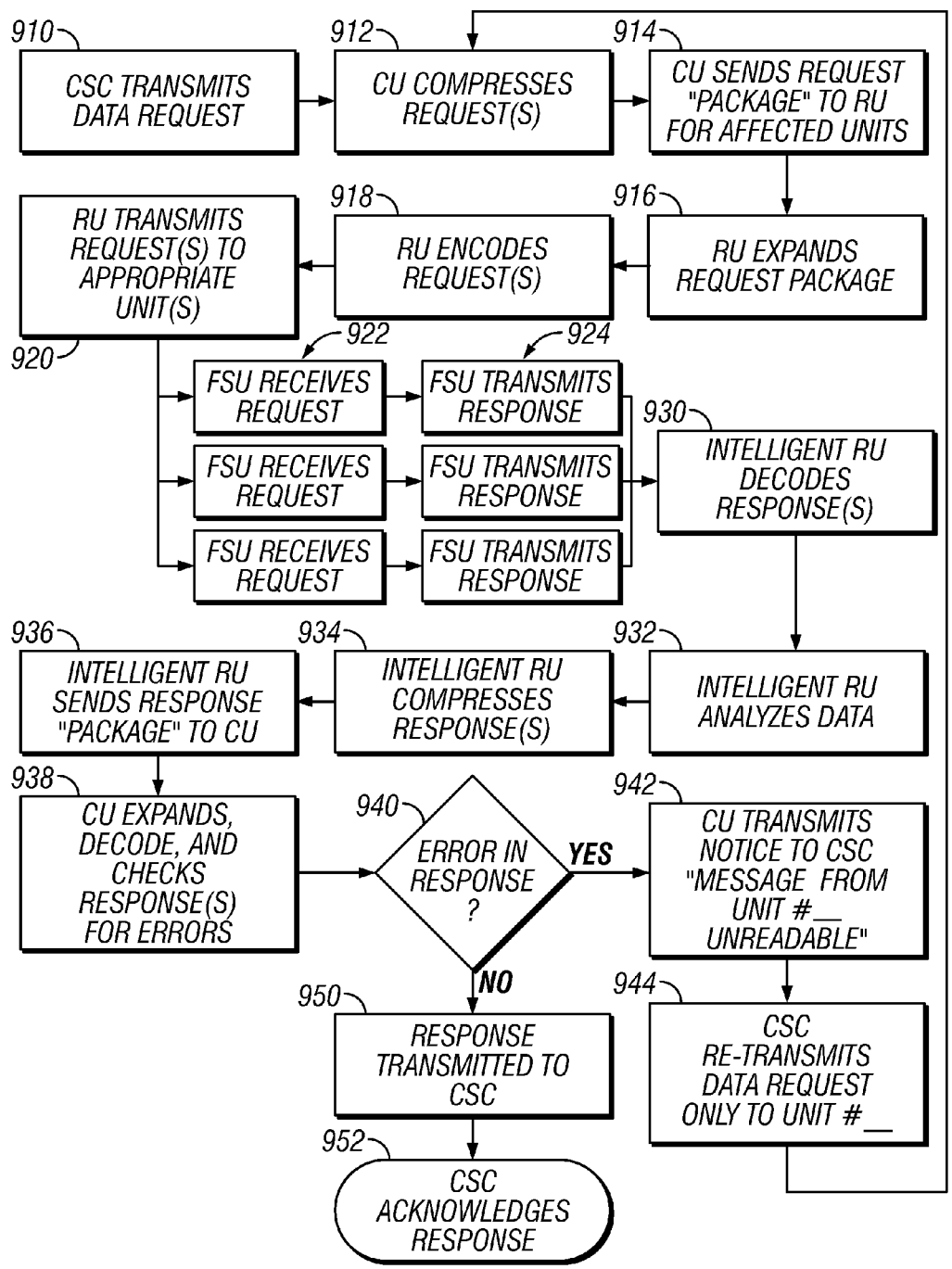
FIG. 9 shows a data flow for messages solicited by a central control unit from field boxes of a seismic surveying system according to one aspect of the disclosure.

The process flow of the messages generated by the FSUs using Alpha FSUs is the same as described above in reference to FIG. 8 because the Alpha FSUs perform the repeater functions described in FIG. 8. The data process flows described above relates to detection and transmission of unsolicited alarm messages. However, as noted earlier, the alarm messages may be generated in response to commands received from a CSC. Such messages are referred to herein as the solicited messages. FIG. 9 shows a data flow 900 for solicited messages according to one method of the disclosure. Solicited messages are typically generated in response to a CSC request for specific information from certain defined FSUs. Once the specified FSUs receive the request, the response may be sent through the same dataflow as unsolicited messages described above. An exception to this may be how the CSC reacts to a message that is found to contain an error because a solicited message is addressed to defined FSUs. The CSU, in such a case, may reissue the request to the specific FSU whose reply contained the error. As shown in FIG. 9, the CSC transmits the requests (910) to the CU, which compresses the requests (912) into a package and sends the package to RU (914). The RU expands the request package received from the CU (916), encodes the requests (918) and transmits the requests to the specific FSUs to which the requests are directed by the CSC (920). The individual FSUs receive their respective requests (922) and in response thereto generate the appropriate responses and transmit them to the RU (924). The RU decodes the messages received from the various FSUs (930), analyzes the decoded messages (932) and compresses the messages (934) into a package and sends the package to CU (936) substantially in the same manner as described in reference to the data flow of FIG. 8. The CU expands, decodes and checks messages for errors (938). If CU finds an error (940) in a particular message from a particular FSU, it transmits a notice to CSC indicating the message that had the error and the FSU from which it was received (942). The CSC then retransmits the request only to the identified FSU (944) via CU. The CU transmits to CSC the decoded messages that do not contain errors (950) and CSC sends acknowledgements (952) for the received messages to the respective FSUs via the CU as described earlier. However, requests by CSC relating to the seismic energy sources utilize RU and CU, but without an analysis b RU.

During a seismic survey acquisition, communication (wireless or cabled) between the field equipment and a control unit runs the inherent risk of data loss and delayed transmission through collision of simultaneous messages. This message data may include seismic or physical (equipment) reports/alarms, source activation ("shot") commands, software program downloads, record uploads, etc. Loss of useful data or a delay in message receipt lowers the effectiveness of the messaging system itself and is potentially detrimental to the survey as a whole.

The present disclosure provides a method in which the transmission of any information/data may be ruled by a structured, prioritized protocol, referred to herein as the "time division multiplex" method. To avoid the collision that occurs when several units attempt to transmit information over a wireless link simultaneously, the method, in one aspect, divides each data transmission time period, such each "one second period" or "one second cycle," into smaller increments of time (time slots), structures data transfer based on unit type and data type, and specifies the increment of each second when particular data can be transferred.

As an example, in one aspect of the method, the message transmission may be operated in three modes that utilize the data transmission time period differently, depending on the status or tasks assigned to the system. The modes are herein referred to as "Normal," "Download" and "Upload," by way of example and for ease of explanation. For each such mode, the one-second period is broken down into three major subdivisions or time slots or time increments. In the example given here, the subdivisions for each mode differ only in how they use the third major subdivision.

In one aspect, during the normal system operations, the third major subdivision may be used for FSU solicited status. In the Upload mode, the third major subdivision may be further sub-divided into two or three message time slots that are used by the FSUs for uploading large files (such as returning seismic data traces). In the Download mode, all available third major subdivision bit times may be allocated to a single message time slot which is used by the central recording unit for downloads (such as sending code revisions or parameter updates to the FSUs).

The Normal mode is typically the most common state of the system during seismic survey acquisition. Typically, the Normal mode is used for primary tasks, including the transmission of general commands from the Central System; unsolicited alarms from field units; and reply of solicited information from the FSUs.

Figure 11A:
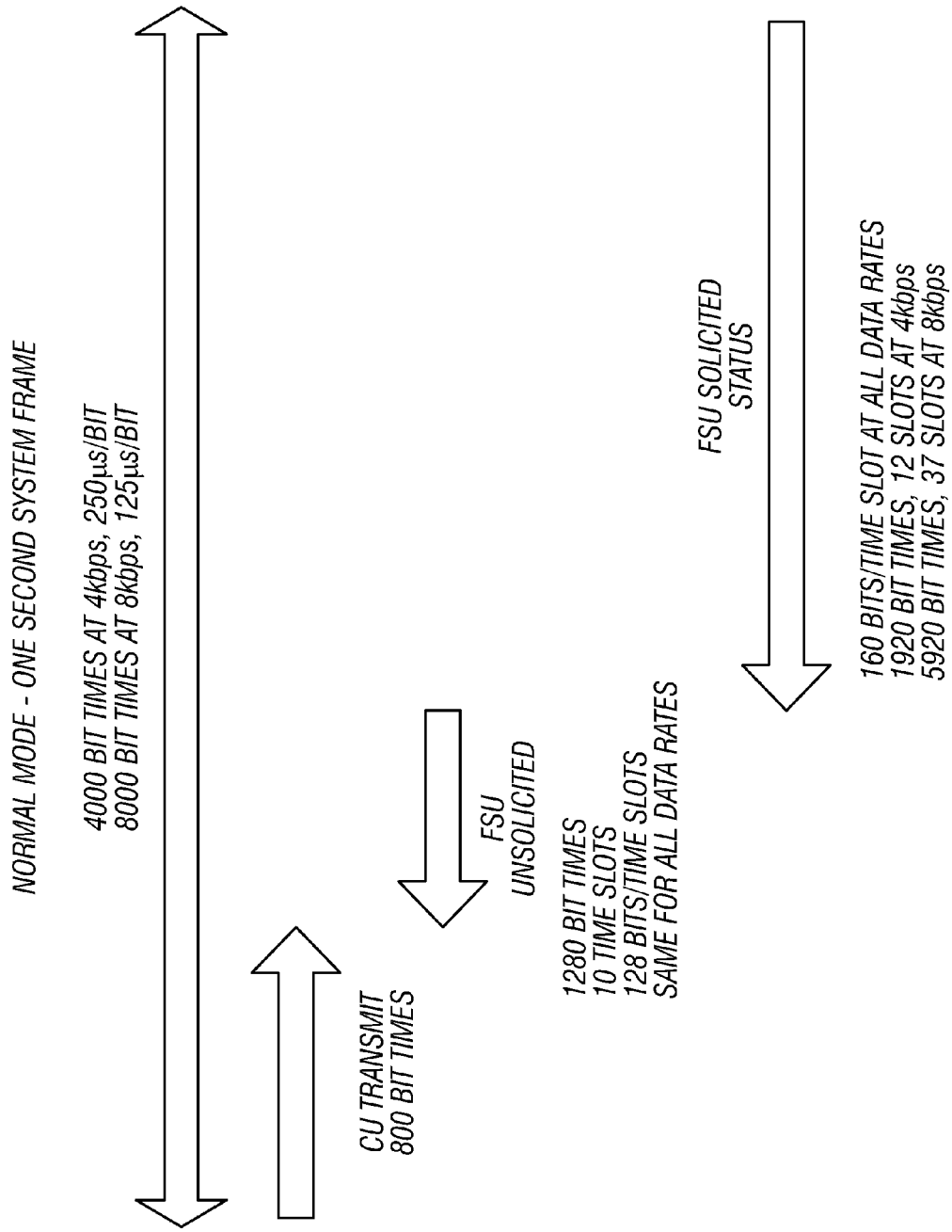
FIGS. 11A-11C show a time division multiplex scheme according to one embodiment of the disclosure.

FIG. 11A illustrates one exemplary division of data for each subdivision (in "Normal" mode) based on a sample data rate (for example, 4 kbps) which may be increased as the data rate increases. The first period or time slot 1112 of the data transmission time period 1110 is shown to correspond to a command period. As shown, the first subdivision of the data transmission time period typically originates at the CU or the CSC. This message may be a command to a particular FSU and/or a repeater unit (RU). An RU in the field can take various actions. In the particular example of FIG. 11A, the total message period is set to 800 bit times (100 bytes, or 0.2 seconds).

The second subdivision or time slot 1114 may relate to an unsolicited alarm or message period. The second subdivision of the data transmission time period cycle is shown to contain a set of ten similar messages that may originate at VHF-capable Ground Equipment (such as FSU, RU). In this example, each message occupies 128 bit times, so the set occupies 1280 bit times, or 0.32 seconds. The messages are typically not originated by command from the central system and they contain status about exception conditions. This motivates their classification as unsolicited status messages. One of the common causes of an unsolicited status message is the instance of a monitored parameter (flagged to generate an alarm) broaching limits.

Some monitored parameters may have both a warning limit and an alarm limit. The former raises a warning flag in the unit's normal status message content, which may not be solicited for review for several seconds, or even a few minutes. The alarm limit breach causes the affected unit to attempt to communicate the problem to the central system via the unsolicited status time window in a minimal time.

The third subdivision or time slot 1116 of the data transmission time period 1111 relates to the solicited status and it contains a set of twelve (as an example) similar messages that originate at the VHF-capable field equipment (for example FSU, RU) when the Normal mode of command-reply cycle is in force. The Normal mode, as depicted in the example of FIG. 11A, has the twelve solicited messages occupying 1920 bit times (160 bits, or 20 bytes each) for a period of 0.48 seconds.

Figure 11B:
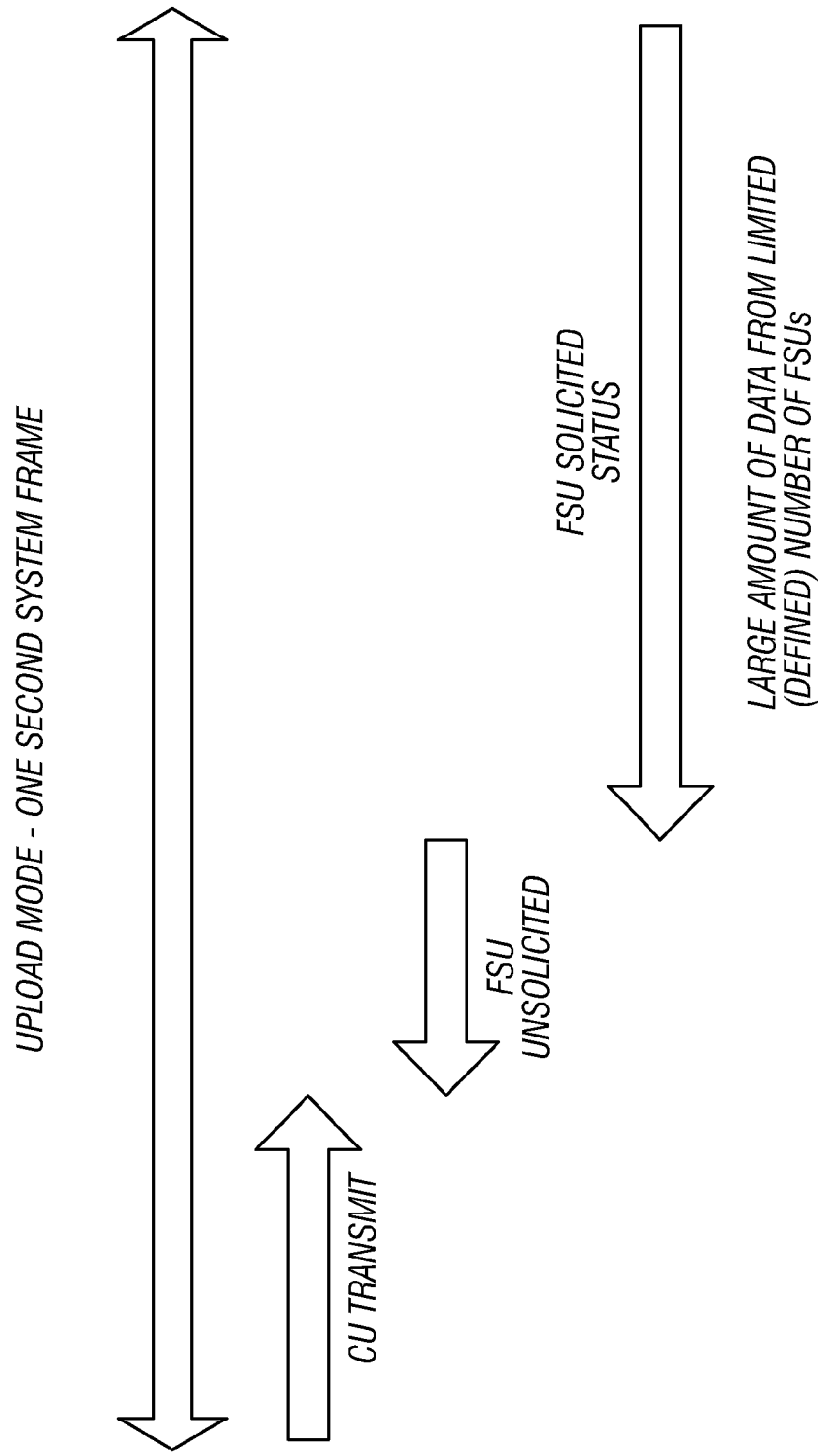

The Upload mode may be used when issues arise with field equipment or conditions and data or logs must be reviewed. During the Upload mode, the CSC may request large data from a select number of FSUs, such as data records or log dumps. The reply period for an FSU's solicited status is shared typically between a few FSUs to allow for more data to be transmitted from those defined units. FIG. 11B illustrates the relative division of data for each subdivision in "Upload"

Figure 11C:
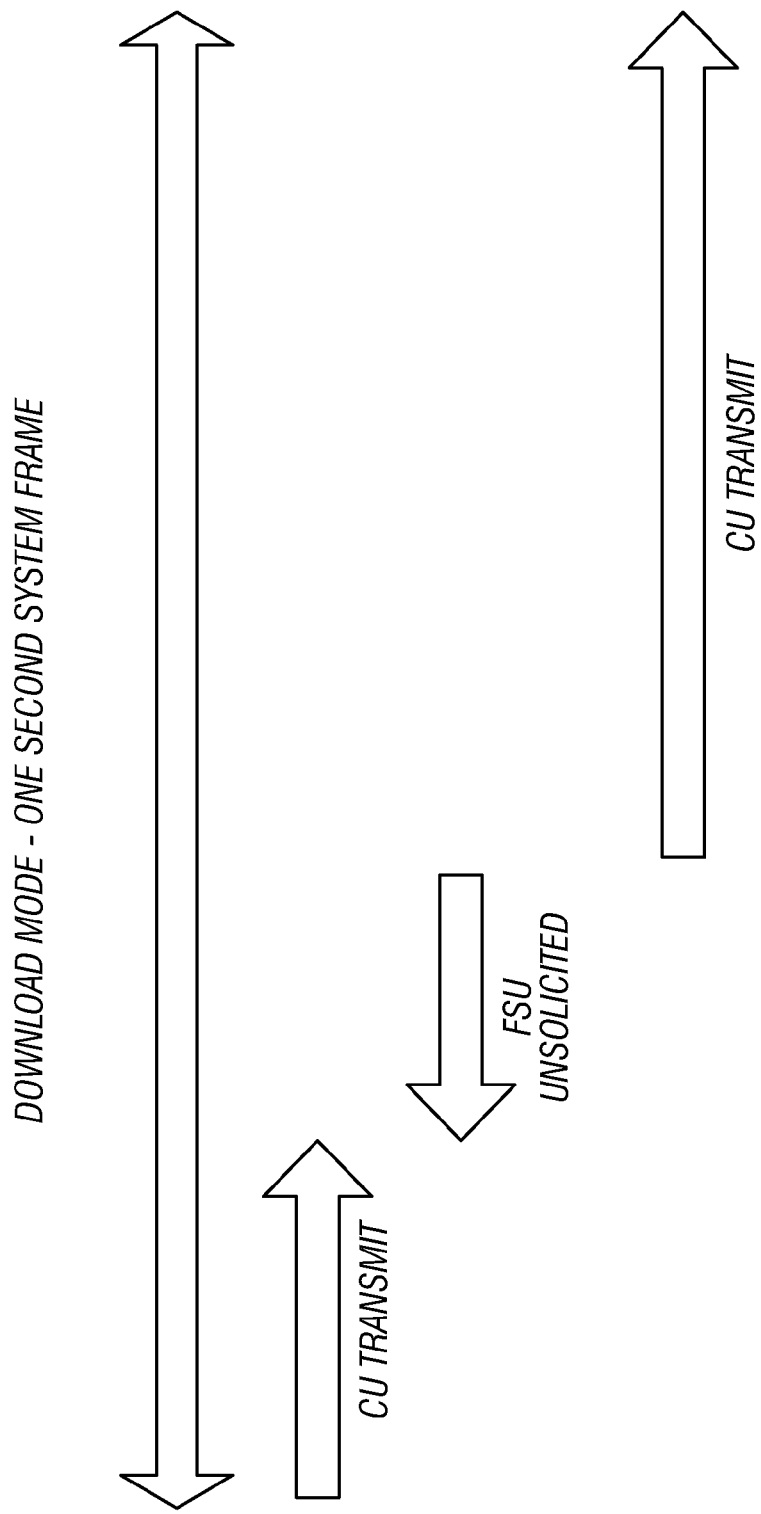

The Download mode may be utilized used to transmit (push) data from the Central System to the field units. During Download mode, the CSC may be pushing or transmitting large datasets to the FSUs, such as software updates or new system parameters. The time frame usually allotted to FSU Solicited Status (during "Normal" mode) may be allocated instead to CU transmissions. FIG. 11C illustrates the relative division of data for each subdivision in "Download" mode.

Figure 1:
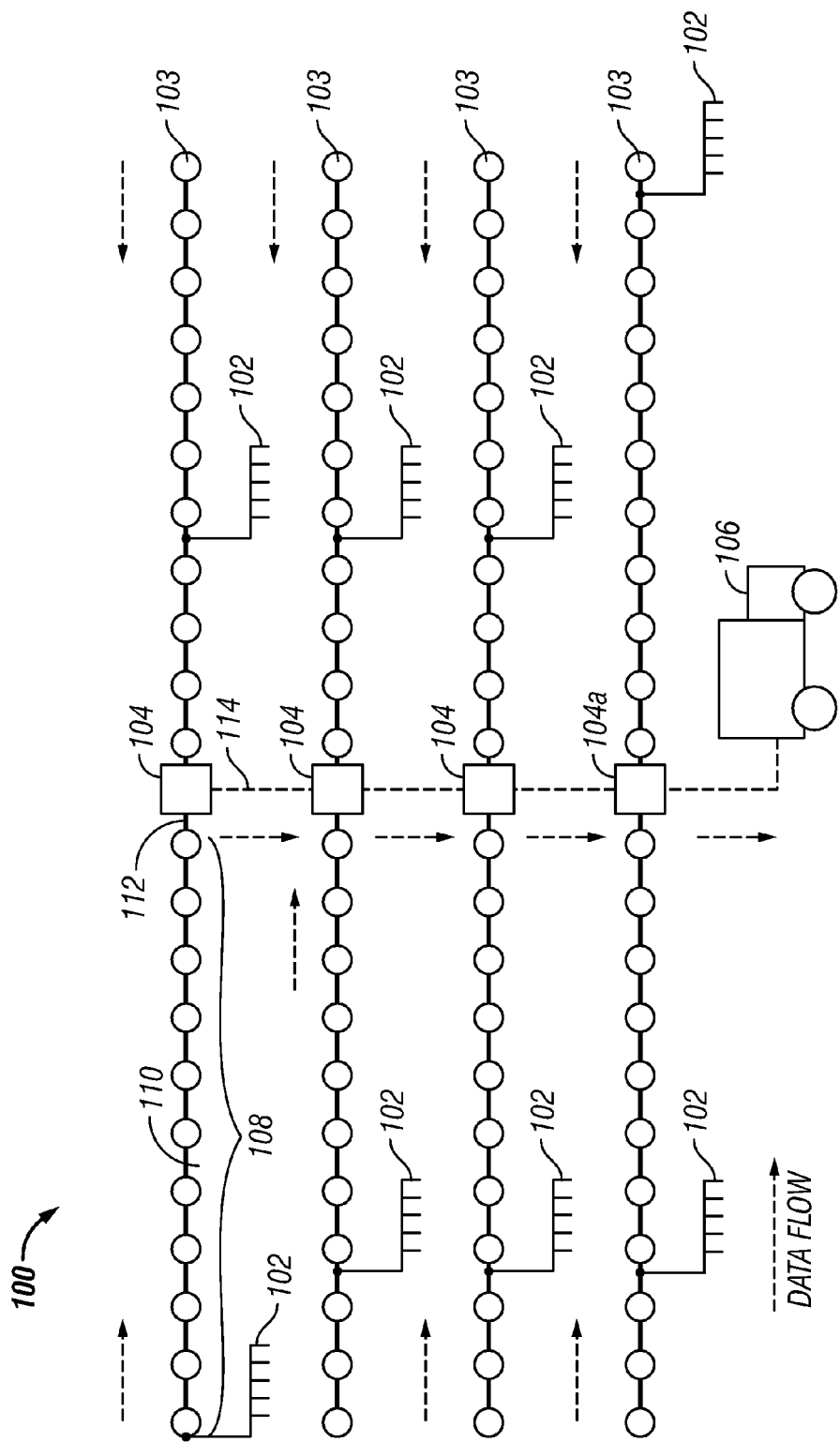
FIG. 1 (prior art) shows a prior art cable seismic data acquisition system.

Thus, as shown in the example of FIGS. 11A-11C a structured, prioritized protocol to rule data transmission may be used to eliminates or reduce the delay or loss of information in addition to the features described in reference to the seismic data acquisition system such as shown in FIG. 2. This method also may be utilized in a cable system, such as shown in FIG. 1. It should be noted the examples of FIGS. 11A-11C only show one possible way of structuring data transmission time periods and their time divisions (i.e. time slots). Any suitable time slot divisions and type of data to be transmittal corresponding to each such time slots may be utilized.

Figure 10:
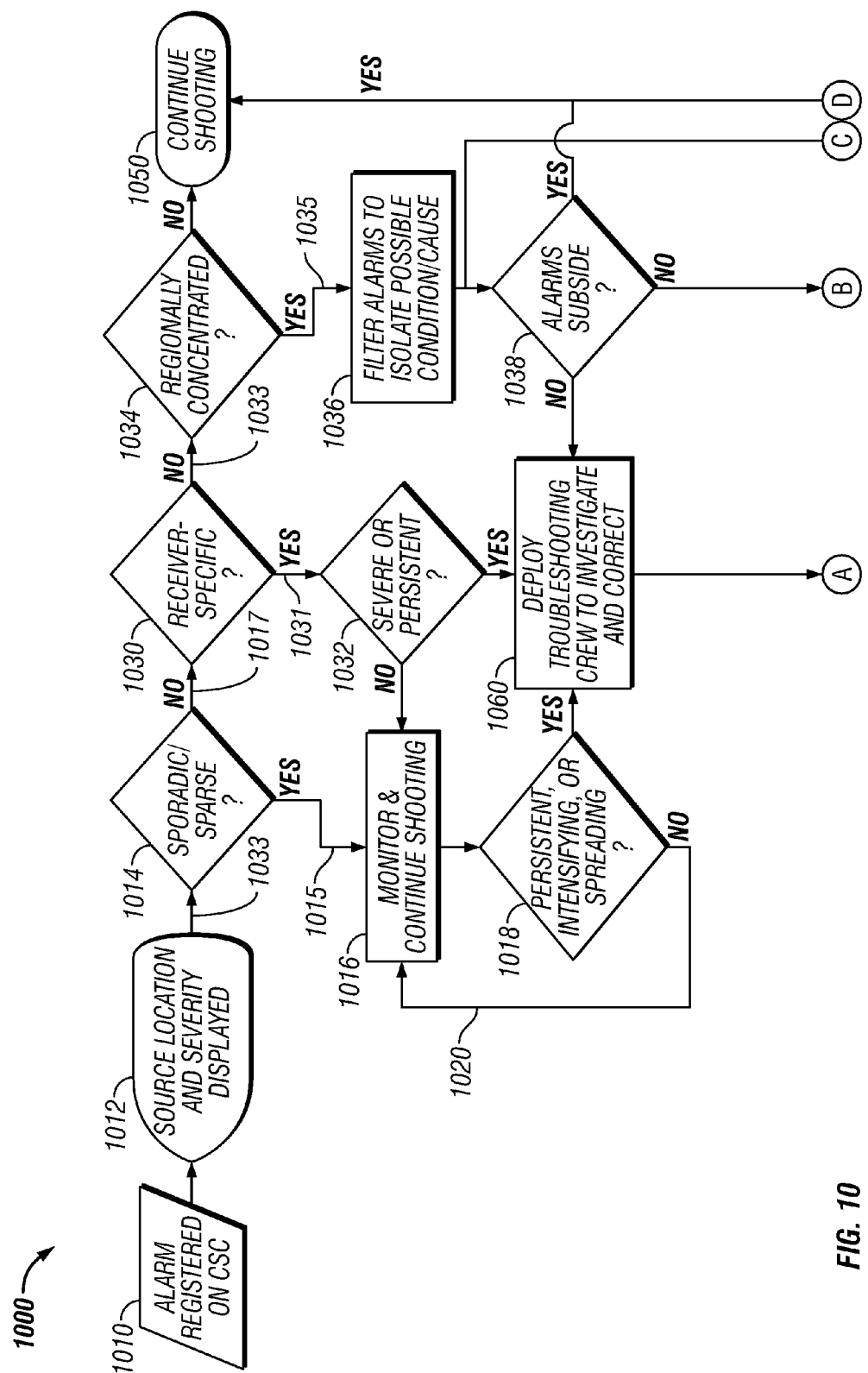
FIG. 10 shows a process flow of messages after the messages have been received by the central control unit according to one aspect of the disclosure.
Figure 10:
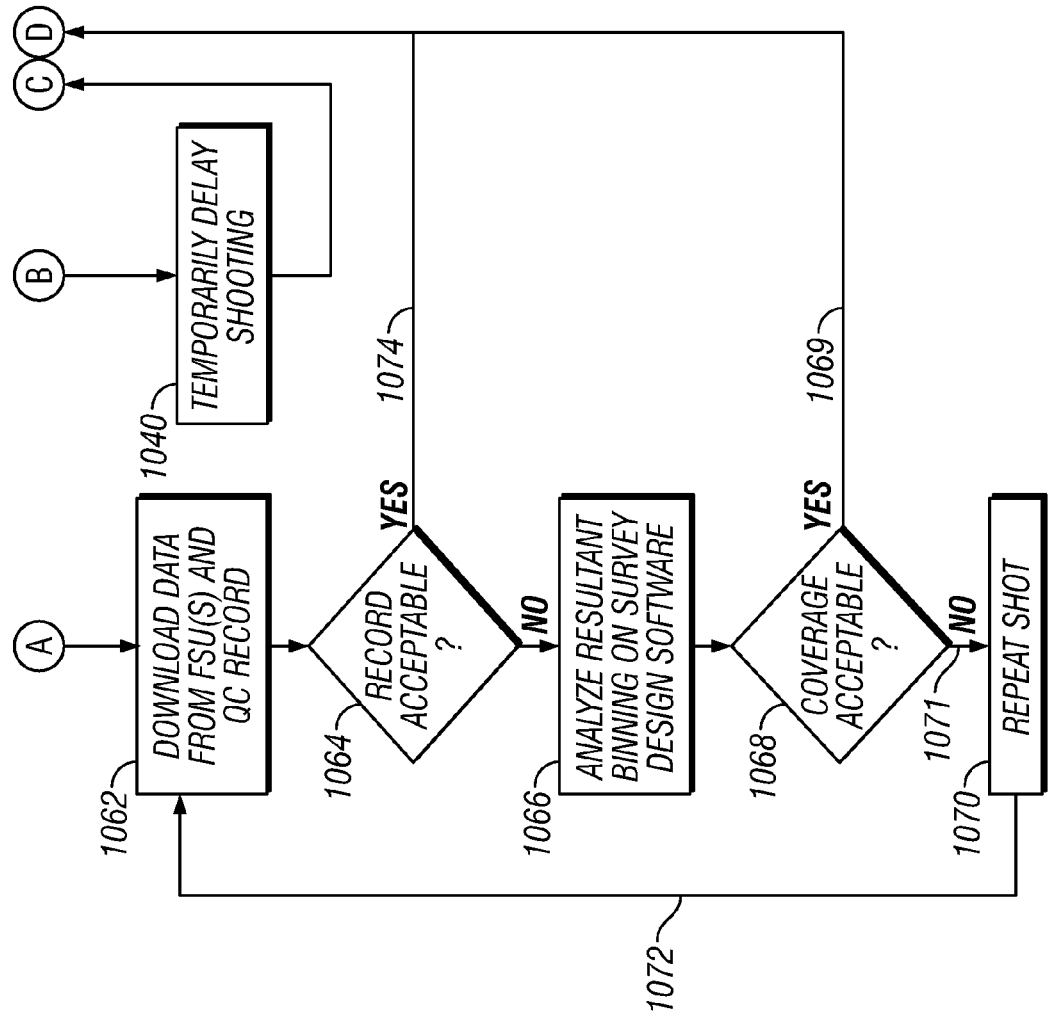

FIG. 10 shows a process flow 1000 after the messages are received by the CSC according to one method of the disclosure. Based on the information relayed to the CSC several scenarios are possible. For example, with respect to a message relating to a physical attribute, the survey crew monitoring the CSC or the CSC itself may deploy field crew to troubleshoot and correct the problem. For a message relating to a seismic attribute, the crew monitoring the CSC or the CSC itself (programmed with tolerance levels for each of the alarm message) determines the alarms and proceeds based on the type of the alarm. In another scenario, the CSC or the crew may ignore alarm messages that are determined to be sporadic or sparse and are within certain tolerance limits and continue to monitor such alarm messages and take specified actions if such messages persist, intensify or become more widespread. For example, if a receiver-specific alarm persists, the field crew may be directed to troubleshoot the problem and correct it before continuing the survey process. Some times the alarm messages may be regionally concentrated. In such a case, the CSC may be programmed to filter the alarm messages to isolate possible conditions while allowing other urgent alarms to transmit. Alternatively, the CSC may be programmed to delay issuing further shooting commands until the alarm messages stop (for example, when the alarms are caused by thunderstorm, railroad or another temporary activity). When numerous, continuous or severe alarms occur, the shooting may be paused and a shot record downloaded to view the affects of the underlying attribute degradation. A decision then may be made to either ignore the affects or re-shoot.

Still referring to FIG. 10, once the alarm messages are registered on the CSC (1010), the source location and the severity of the message is displayed (1012) on a suitable display device associated with the CSC for viewing and taking action. If the alarm message is sporadic or sparse (1014, 1015), the shooting and monitoring of the alarm condition is continued (1016). If the alarm condition is persistent, intensifies or is spreading to (1018), crew may be deployed to investigate and correct the problem (1060). If the alarm condition remains sporadic and sparse (1020), the shooting may be continued (1016). If the crew is deployed (1060), it may download data from affected FSUs, including the quality control (QC) data (1062). If the downloaded data indicates that the records are determined acceptable (1064, 1074), shooting is continued (1050). If the records are unacceptable, the crew may analyze resultant binning on the survey design software (1066) and if the coverage is acceptable (1068, 1069), the shooting is continued (1050). If not, (1071), the shot is repeated (1070). If the alarm condition is not sporadic or sparse (1017), is not receiver specific (1034) and also is not regionally concentrated, the shooting may be continued (1050). If however the alarm condition is receiver specific (1030) and is severe or persists (1032), a trouble-shooting crew may be deployed to investigate and correct the problem (1060) as described above. If the alarm condition is regionally concentrated (1034,1035) the alarm messages may be filtered to isolate the condition and cause of the attribute degradation (1036). If, after taking the corrective action, the alarm condition subsides (1038), the shooting is continued (1050), otherwise the shooting is delayed until the problem is corrected and the alarm condition subsides to an acceptable level. The flow process shown in FIG. 10 is one way to process the unsolicited alarm messages received at the CSC. Other suitable processes may be used for processing the alarm messages.

Thus, in one aspect, the disclosure provides a system for acquiring seismic data that may include: a source for generating acoustic signals into a subsurface of the earth; a plurality of receivers placed in a selected region for detecting signals reflected from the subsurface and responsive to the generated acoustic signals; and a plurality of field station units (FSUs), wherein each FSU in the plurality of FSUs receives acoustic signals detected by at least one receiver associated therewith in the plurality of receivers; detects a condition for each of a plurality of attributes relating to acquisition of the seismic data; and transmits wirelessly a plurality of messages to a remote unit indicative of the condition for each attribute when such condition meets a selected criterion. The selected criterion may be a threshold value or a range of values. In one aspect, each FSU may encode each message with a unique identifier. The unique identifier may be one of: (i) an identification number of the FSU; (ii) an identification number of the FSU and a time slot; (iii) a variable value; (iv) a fixed value; and (iv) a random number generated by a random number generator. The attributes may be one or more of: (i) a power source condition; (ii) a motion sensor measurement; (iii) a shot condition; (iv) a data storage medium condition; (v) a timing error condition; (vi) a seismic alarm condition; (vii) an environmental parameter condition; (viii) a configuration error condition; (ix) a data download condition; (x) a software condition; (xi) a noise condition; (xii) a device-initiated activity including one of (a) status of turning off a device, and (b) status of turning on a device; (xiii) a pre-shot test condition; and (xiv) a synchronization condition. In another aspect, the FSUs may prioritize messages before sending the messages. The FSUs also may perform an operation that is at least one of: (i) discards a detected condition; (ii) retransmits a particular message when the selected FSU does not receive an acknowledgement from the remote unit within a selected time period; (iii) limits the number of times a message is transmitted corresponding to a particular detected condition; (iv) filters a message in response to a filter received from the remote unit or a pre-assigned filter; (v) suppresses an unwanted message; (vi) suppresses a plurality of messages corresponding to a storm condition; (vii) transmits selected messages uninhibited; (viii) analyzes an attribute of a message to determine if a storm condition exists; (ix) arranges a plurality of messages into a common packet before transmitting such a plurality of messages; and (x) decodes messages received from the remote unit before transmitting any unsolicited message.

In another aspect, the FSUs may transmit messages automatically (unsolicited) or in response to a solicitation command received from the remote unit. The remote unit may send a signal to a particular FSU that acknowledges receipt of a message, solicits a message for a particular condition, and/or provides a filter. In another aspect, the remote unit may arrange the received messages according to a selected criterion and provide the arranged messages in a printed form and/or as a visual display.

In another aspect, a method for acquiring seismic data using a plurality of FSUs placed over a region of interest is provided, wherein the method may include: determining a condition associated with each of a plurality of attributes relating to acquisition of the seismic data at each of the FSUs; generating messages at each FSU when the condition of any particular attribute meets a selected criterion; and transmitting the generated messages to a remote unit wirelessly. The messages may be transmitted unsolicited by the remote unit or in response to a solicitation from the remote unit. The attributes may be physical attributes, seismic attributes, time parameters and/or location parameters. The comprising prioritizing transmission of each message generated at each FSU. The method may further encode each message with an identifier that includes one of: (i) a variable value, (ii) a fixed value; (iii) a random number; and (iv) an identification number of the FSU; and (v) an identification number of the FSU and a specific time slot within a preselected time period.

In another aspect, the disclosure provides a time division multiplexing method for transferring data between devices during seismic data acquisition. In one aspect, the time division multiplexing technique may be useful in efficiently utilizing an available bandwidth and in another aspect may manage collision among transmission of messages between devices. In one aspect, the method may be used for transmitting data between a remote unit and a plurality of FSUs placed over a region of interest, wherein each FSU acquires seismic data from at least one seismic receiver placed in a region of interest. The method may include: specifying a data transmission time period having a fixed continuous time length for transmission of data between the remote unit and each FSU in the plurality of FSUs; dividing the data transmission time period into a plurality of time slots, each time slot having a fixed time length; and transmitting data from the remote unit to each FSU during at least one of the time slots and from each FSU to the remote unit during at least another time slot. The method may transmit the data between the remote unit and each FSU in a plurality of modes. One particular mode may include: transmitting data from the remote unit to each FSU during a first time slot, transmitting unsolicited messages from FSUs to the remote unit during a second time slot that succeeds the first time slot and transmitting messages that are solicited by the remote unit from selected FSUs during a third time slot that succeeds the second time slot. Another particular mode may include: transmitting data from the remote unit to each FSU during a first time a slot, sending unsolicited messages from each FSU to the remote unit during a second time slot that succeeds the first time slot and transmitting data from the remote unit to selected FSUs in the plurality of FSUs during a third time slot that succeeds the second time slot. The data transmitted by the remote unit in any mode may precede the data transmitted by the FSUs. The data between the remote unit and each FSU during acquisition of seismic data for a seismic spread may be transferred by repeatedly using the specified time period and the time slots.

In another aspect, a computer-readable medium may be provided that includes a computer program embedded therein and accessible to a processor for executing the computer program, the processor being associated with a seismic data acquisition spread that includes a plurality of receivers for detecting acoustic signals and a plurality of field service units (FSU), each FSU being associated with at least one receiver for acquiring and processing the acoustic signals, wherein the computer program includes: instructions to determine a condition associated with each of a plurality of preselected attributes relating to acquisition of the seismic data by an FSU; instructions to generate messages at the FSU when the condition of a particular attribute meets a selected criterion; instructions to transmit the generated messages to a remote unit wirelessly. The computer program may further include instructions to send unsolicited messages and instructions to manage at least one aspect that utilizes the bandwidth effectively and avoids collision between messages. The computer program may further include instructions to prioritize transmission of each message generated by the FSU. The computer program may further include instructions to execute an algorithm that prevents at least a partial flooding of the messages to the remote unit when the messages correspond to one of: (i) a common (storm) condition, and (ii) a selected condition.

In another aspect, a method of collision management is provided that may include the features of: generating a plurality of messages, each message corresponding to a detected condition relating to an attribute of the acquisition of the seismic data; performing a collision management on the generated messages; and transmitting the messages after performing the collision management to a remote unit for further processing of the messages. Performing collision management may further include one of: (i) suppressing an unwanted message; (ii) suppressing a plurality of messages corresponding to a common (storm) condition; (iii) prioritizing the messages based on a selected criterion before sending the messages to the remote unit; (iv) allowing selected messages to pass to the remote unit substantially uninhibited; (v) analyzing an attribute of a message storm based on a pre-selected criterion, and (vi) grouping data relating to a plurality of messages into a single packet for sending such packet to the remote unit.

The disclosure herein is provided in reference to particular embodiments and processes to illustrate the concepts and methods. Such particular embodiments and processes are not intended to limit the scope of the disclosure or the claims. All such modifications within the scope of the claims and disclaimers are intended to be part of this disclosure.

What is claimed is:

1. A method for acquiring seismic data using a plurality of field service units (FSUs) placed over a region of interest, the method comprising:
    determining a condition associated with each of a plurality of attributes relating to acquisition of the seismic data at each of the FSUs;
    generating messages at each FSU when the condition of a particular attribute meets a selected criterion;
    transmitting the generated messages;
    receiving the messages transmitted by at least a group of FSUs in the plurality of FSUs at a repeater unit placed in the region of interest;
    separating the messages received from the group of FSUs by the repeater unit into at least two categories based on at least one predefined limit in the repeater unit, wherein a first category of the at least two categories includes at least one message, which includes the condition that exceeds the at least one predefined limit; and
    transmitting information relating to the messages in the first category to a remote unit; and
    analyzing the received messages from the group of FSUs to determine occurrence of a storm condition and transmitting a message to the remote unit indicative of the storm condition.

2. The method of claim 1, wherein the repeater unit is one of: (i) a stand alone unit spaced apart from the FSUs in the group; and (ii) a selected FSU that belongs to the group of FSUs.

3. The method of claim 1, wherein the condition is one of: (i) a power source condition; (ii) a motion sensor measurement; (iii) a shot condition; (iv) a data storage medium condition; (v) a timing error condition; (vi) a seismic alarm condition; (vii) an environmental parameter condition; (viii) a configuration error condition; (ix) a data download condition; (x) a software condition; (xi) a noise condition; (xii) a device-initiated activity including one of (a) status of turning off a device, and (b) status of turning on a device; (xiii) a pre-shot test condition; and (xiv) a synchronization condition.

4. The method of claim 1 further comprising using the repeater to perform at least one of: (i) suppresses an unwanted message; (ii) suppresses a plurality of messages corresponding to a common (storm) condition; (iii) prioritizes the messages received from the plurality of FSUs before sending a message to the remote unit; (iv) allows selected messages to pass to the remote unit substantially uninhibited; (v) analyzes an attribute of a message storm based on a pre-selected criterion; (vi) compresses messages for sending to the remote unit; (vii) compresses a plurality of messages into a packet before further transmitting such plurality of messages; and (viii) decodes messages received from the remote unit before transmitting a message received from the remote unit to a particular FSU.

5. The method of claim 1 further comprising scaling transmission of messages to the remote unit at the repeater unit in a manner that utilizes wireless bandwidth that is less than the bandwidth that would be required for directly transmitting the messages from the group of SFUs to the remote unit.

6. The method of claim 1 further comprising communicating data between the remote unit and the repeater unit via one of: (i) a radio frequency link; and (ii) an Ethernet connection.

7. The method of claim 1, wherein the remote unit communicates with the group of FSU's via the repeater unit and with the remaining FSUs in the plurality of FSUs wirelessly.

8. The method of claim 1 further comprising sending filters to selected FSUs in the group of FSUs from the repeater unit.

9. A computer-readable medium having a computer program embedded therein and accessible to a processor for executing the computer program, the processor being associated with a seismic data acquisition spread that includes a plurality of receivers for detecting acoustic signals and a plurality of field service units (FSUs), each FSU being associated with at least one receiver for acquiring and processing acoustic signals, wherein the computer program comprises:
    instructions to determine a condition associated with each of a plurality of preselected attributes relating to acquisition of the seismic data by an FSU;
    instructions to generate messages at the FSU when the condition of any particular attribute meets a selected criterion;
    instructions to transmit the generated messages wirelessly;
    instructions to receive messages transmitted by at least a group of FSUs in the plurality of FSUs at a repeater unit placed in the region of interest;
    instructions to separate the messages received from the group of FSUs by the repeater unit into at least two categories based on at least one predefined limit in the repeater unit, wherein a first category of the at least two categories includes at least one message, which includes the condition that exceeds the at least one predefined limit; and
    instructions to transmit information relating to the messages in the first category to a remote unit; and
    instructions to analyze the received messages from the group of FSUs to determine occurrence of a storm condition and transmitting a message to the remote unit indicative of the storm condition.

10. The computer-readable medium of claim 9, wherein the computer program further comprises instructions to transmit messages from an FSU in the group of FSUs without solicitation by the repeater unit.

11. The computer-readable medium of claim 9, wherein the computer program further comprises instructions to prioritize transmission of the messages received at the repeater before transmission of such messages to the remote unit.

12. The computer-readable medium of claim 9, wherein the computer program further comprises instructions to encode each message with an identifier that includes one of: (i) a variable value, (ii) a fixed value; (iii) a random number; and (iv) an identification number of the FSU; and (v) an identification number of the FSU and a specific time slot within a preselected time period.

13. The computer-readable medium of claim 9, wherein the computer program further comprises instruction to perform an operation that is at least one of: (i) discarding a detected condition; (ii) retransmitting a particular encoded message when the receipt of the particular message is not acknowledged by the remote unit; (iii) limiting a number of times a message is transmitted corresponding to a particular detected condition; and (iv) suppressing a message in response to a filter received from the remote unit or a pre-assigned filter; (v) suppressing an unwanted message; (vi) suppressing a plurality of messages corresponding to a common (storm) condition; (vii) transmitting selected messages uninhibited; (viii) analyzing an attribute of a message to determine if a storm condition exists; (ix) arranging a plurality of messages into a common packet before transmitting such a plurality of messages; (x) decoding messages received from the remote unit before transmitting any unsolicited message; and (xi) allowing automatic transmission of messages relating to a selected condition.

14. The computer-readable medium of claim 9, wherein the computer program further comprises instructions to send a filter to a particular FSU in the group of FSUs.

15. The computer-readable medium of claim 9, wherein the computer program further comprises instructions to execute an algorithm that prevents at least a partial flooding of the messages to the remote unit when the messages correspond to one of: (i) a common (storm) condition, and (ii) a selected condition.

\* \* \* \* \*